United States Patent
Kim

(10) Patent No.: US 12,498,817 B2
(45) Date of Patent: Dec. 16, 2025

(54) TOUCH DISPLAY DEVICE FOR PEN TOUCH WITH ENHANCED UPLINK SIGNAL TO SUPPLIES TDX EFFECT

(71) Applicant: LG Display Co., Ltd., Seoul (KR)

(72) Inventor: SungChul Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/740,178

(22) Filed: Jun. 11, 2024

(65) Prior Publication Data

US 2025/0021182 A1    Jan. 16, 2025

(30) Foreign Application Priority Data

Jul. 14, 2023   (KR) .................... 10-2023-0091450

(51) Int. Cl.
*G06F 3/041*    (2006.01)
(52) U.S. Cl.
CPC ................... *G06F 3/04162* (2019.05)
(58) Field of Classification Search
CPC .................................................. G06F 3/04162
See application file for complete search history.

(56) References Cited

U.S. PATENT DOCUMENTS

| | | |
|---|---|---|
| 2019/0146602 A1 | 5/2019 | Kadowaki et al. |
| 2021/0397297 A1 | 12/2021 | Ding et al. |
| 2022/0100340 A1* | 3/2022 | Oh ............... G06F 3/04166 |
| 2022/0129129 A1 | 4/2022 | Lim |
| 2022/0214791 A1* | 7/2022 | Cho ................... G09G 3/20 |
| 2023/0138450 A1 | 5/2023 | Kim et al. |
| 2023/0195260 A1 | 6/2023 | Yuan et al. |

FOREIGN PATENT DOCUMENTS

| | | |
|---|---|---|
| JP | 2020013576 A | 1/2020 |
| JP | 2022115333 A | 8/2022 |
| JP | 2022174440 A | 11/2022 |
| KR | 20230053011 A | 4/2023 |
| TW | 202008137 A | 2/2020 |

* cited by examiner

*Primary Examiner* — Lisa S Landis
(74) *Attorney, Agent, or Firm* — Seed Intellectual Property Law Group LLP

(57) ABSTRACT

A touch display device and a driving method for the touch display device are disclosed. A touch circuit supplies an uplink signal to a touchscreen panel. A first uplink signal which is a first waveform signal is supplied to a first touch electrode. A second uplink signal which is a second waveform signal is supplied to a second touch electrode. The effect of the uplink signal on display driving is prevented.

19 Claims, 26 Drawing Sheets

TOUCH DISPLAY DEVICE FOR PEN TOUCH WITH ENHANCED UPLINK SIGNAL TO SUPPLIES TDX EFFECT

CROSS REFERENCE TO RELATED APPLICATION

This application claims priority from Korean Patent Application No. 10-2023-0091450, filed on Jul. 14, 2023, which is hereby incorporated by reference for all purposes as if fully set forth herein.

BACKGROUND

Technical Field

Embodiments relate to a touch display device and a driving method for the touch display device.

Description of Related Art

Along with the development of the information society, demand for various types of display devices for displaying images is increasing. A variety of display devices are commonly used, including liquid crystal displays, electroluminescent displays, or quantum dot light-emitting displays.

Such a display device has a touch-based user interface to detect a touch, input to a display panel using a finger of a user or a pen (or a smart the pen such as a stylus), and perform input processing based on the detected touch in order to provide a greater variety of functions.

For the pen touch driving, the touch circuit and the pen may exchange uplink signals and downlink signals.

BRIEF SUMMARY

Pen touch driving and display driving may be performed concurrently (or simultaneously).

In this case, a signal for the pen touch driving may affect the display driving.

As a result, there is a problem in the related art that an issue appears in the display panel. Various embodiments of the present disclosure address one or more technical problems in the related art including the problem identified above.

Accordingly, embodiments may provide a touch display device and a driving method for the touch display device in which the pen touch driving and display driving may be performed concurrently (or simultaneously).

Embodiments may provide a touch display device and a driving method for the touch display device able to prevent the pen touch driving from affecting display driving.

Embodiments may provide a touch display device and a driving method for the touch display device able to prevent an issue from appearing in the display panel.

Embodiments may provide a touch display device and a driving method for the touch display device able to improve the performance of the pen touch driving.

Embodiments may provide a touch display device and a driving method for the touch display device enabling low power driving by preventing an issue from appearing in the display panel.

Embodiments may provide a touch display device including: a display panel on which a plurality of subpixels are disposed; a touchscreen panel on which a plurality of touch electrodes are disposed; and a touch circuit supplying an uplink signal and a touch driving signal to the touchscreen panel, wherein the uplink signal includes a first uplink signal and a second uplink signal, the first uplink signal that is a first wavelength signal is supplied to a first touch electrode among the touch electrodes, and the second uplink signal that is a second wavelength signal having a different waveform from the first wavelength signal is supplied to a second touch electrode among the touch electrodes.

The second wavelength signal may be a signal inverted with respect to the first wavelength signal. In another example, the second wavelength signal may be a signal out-of-phase with respect to the first waveform signal.

Embodiments may provide a driving method for a touch display device, the driving method including: an uplink signal output operation of supplying an uplink signal to a touchscreen panel on which plurality of touch electrodes are disposed; and a downlink signal output operation in which a pen that has received the uplink signal outputs a downlink signal corresponding to the uplink signal, wherein the first uplink signal is supplied to a first touch electrode among the touch electrodes, and the second uplink signal is supplied to a second touch electrode among the touch electrodes.

According to embodiments, provided are a touch display device and a driving method for the touch display device able to concurrently (or simultaneously) perform pen touch driving and display driving.

Embodiments may provide a touch display device and a driving method for the touch display device able to prevent the pen touch driving from affecting the display driving.

Embodiments may provide a touch display device and a driving method for the touch display device able to prevent an issue from appearing in the display panel.

Embodiments may provide a touch display device and a driving method for the touch display device able to improve the performance of the pen touch driving.

Embodiments may provide a touch display device and a driving method for the touch display device enabling low power driving by preventing an issue from appearing in the display panel.

DESCRIPTION OF THE SEVERAL VIEWS OF THE DRAWINGS

The above and other objectives, features, and advantages of the present disclosure will be more clearly understood from the following detailed description, taken in conjunction with the accompanying drawings, in which.

DETAILED DESCRIPTION

Figure 1:
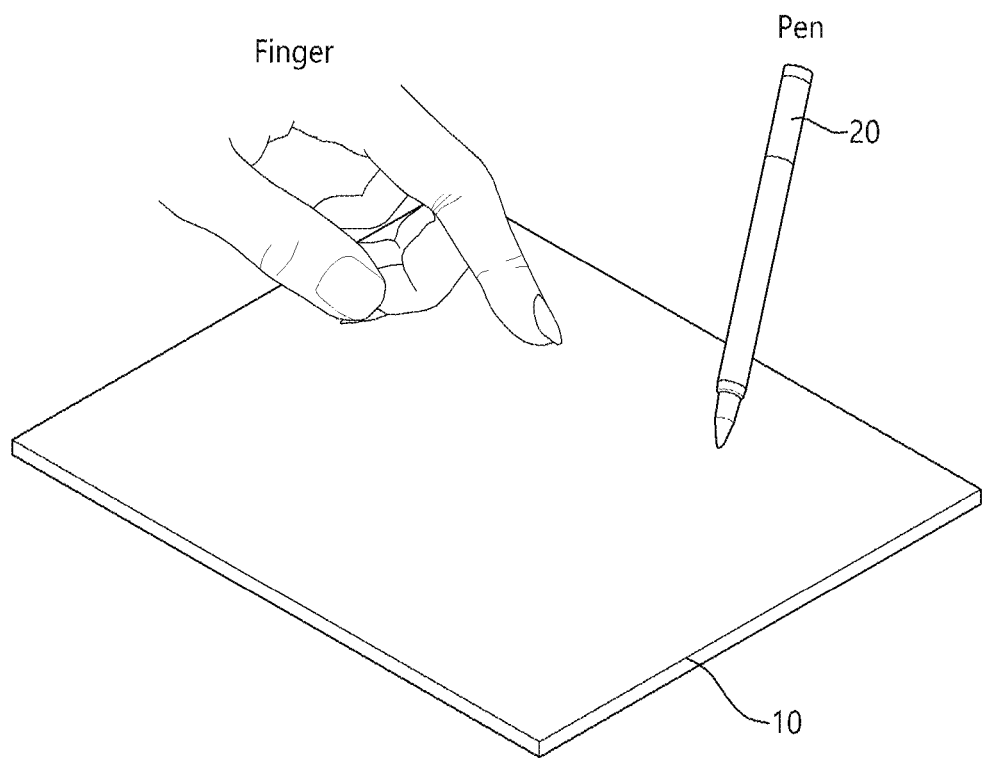
FIG. 1 is a perspective diagram schematically illustrating a touch system according to embodiments.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted in the case in which the subject matter of the present disclosure may be rendered unclear thereby. It will be understood that the terms "comprise", "include", "have", and any variations thereof used herein are intended to cover non-exclusive inclusions unless explicitly stated to the contrary. Descriptions of elements in the singular form used herein are intended to include descriptions of elements in the plural form, unless explicitly stated to the contrary.

In addition, terms, such as first, second, A, B, (a), or (b), may be used herein when describing elements of the present disclosure. Each of these terminologies is not used to define the essence, order, or sequence of a corresponding element but used merely to distinguish the corresponding element from other elements.

It will be understood that when an element is referred to as being "connected", "coupled", or "joined" to another element, not only can it be "directly connected, coupled, or joined" to the other element, but it can also be "indirectly connected, coupled, or joined" to the other element via an "intervening" element. Here, the other element may be included in two or more elements "connected", "coupled", or "joined" to each other.

When time or flow relative terms, such as "after", "subsequent to", "next", "before", and the like, are used to describe elements, methods of operation, methods of manufacture, and the like, these terms may be used to describe non-consecutive or non-sequential flows or methods unless the term "directly" or "immediately" is used together.

In addition, when any dimensions or corresponding information (e.g., levels) for elements are mentioned, it should be considered that dimensions or corresponding information include a tolerance or error range that may be caused by various factors (e.g., process factors, internal or external impacts, and noise) even when a relevant description is not specified.

Hereinafter, a variety of embodiments will be described in detail with reference to the accompanying drawings.

FIG. 1 is a perspective diagram schematically illustrating a touch system according to embodiments.

The touch system according to embodiments may include a touch display device 10, a pen 20 working in concert with the touch display device 10, and the like.

The touch display device 10 may provide not only an image display function to display images, but also a touch sensing function using a finger, the pen 20, or the like.

Herein, the term "pen 20" may include an active the pen, a passive the pen, and the like. The active the pen is a touch tool that has a signal transmitting and receiving function, may work in concert with the touch display device 10, or includes a power source therein. The passive the pen is a touch tool that does not have a signal transmitting and receiving function and lacks a power source therein.

In this context, the touch tool is not only a finger, but also any object able to touch the screen on behalf of the finger, and may also be referred to as a touch object or a touch pointer.

In the following, the finger may be considered to be representative of a passive touch tool such as a passive the pen, and the pen 20 may be considered to be representative of an active touch tool such as an active the pen. Herein, the pen 20 may also be referred to as a stylus, a stylus the pen, an active stylus the pen, or the like.

The touch display device 10 according to embodiments may be, for example, a television (TV), a monitor, or the like, or may be a mobile device such as a tablet, a smartphone, or the like.

The touch display device 10 according to embodiments may include a display part for providing an image display function and a touch sensing part for touch sensing.

Figure 2:
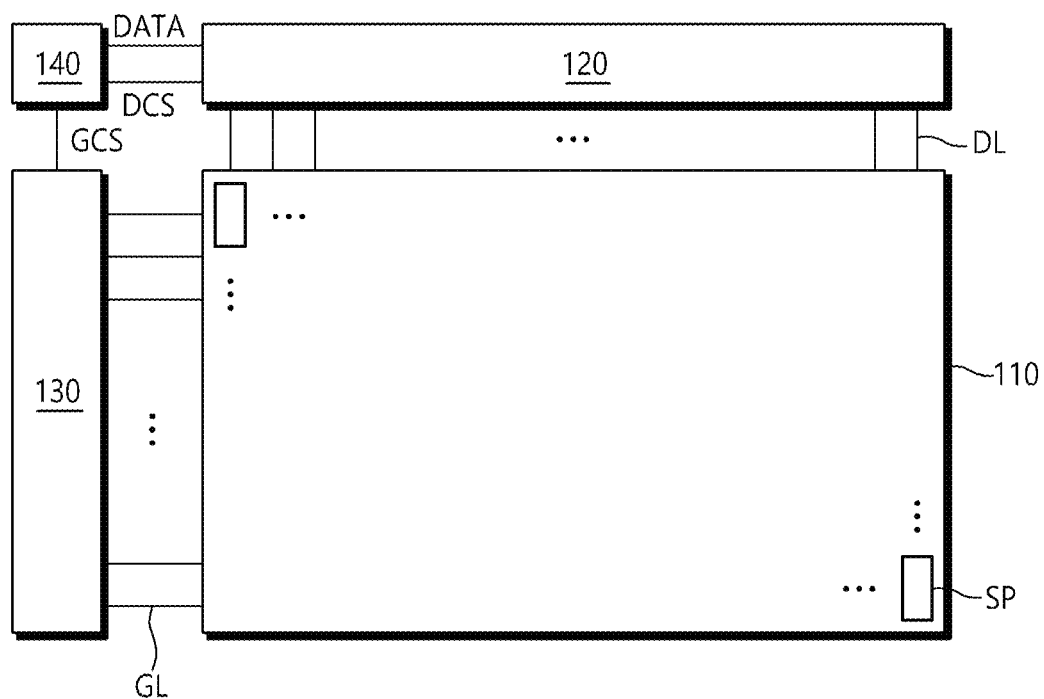
FIG. 2 illustrates the display part in the touch display device according to embodiments.

FIG. 2 illustrates the display part in the touch display device 10 according to embodiments.

Referring to FIG. 2, the display part of the touch display device 10 according to embodiments may include a display panel 110, a data driver circuit 120, a gate driver circuit 130, a display controller 140, and the like.

In the display panel 110, a plurality of data lines DL and a plurality of gate lines GL are disposed, and a plurality of subpixels SP defined by the plurality of data lines DL and the plurality of gate lines GL are arranged.

The data driver circuit 120 drives the plurality of data lines DL by supplying a data voltage to the plurality of data lines DL.

The gate driver circuit 130 drives the plurality of gate lines GL by sequentially supplying scan signals to the plurality of gate lines GL.

The display controller 140 supplies various control signals DCS and GCS to the data driver circuit 120 and the gate driver circuit 130 to control the operation of the data driver circuit 120 and the gate driver circuit 130.

The display controller 140 starts scanning at time points defined for respective frames, converts image data input from an external source according to a data signal format readable by the data driver circuit 120, outputs converted image data DATA, and controls data driving at appropriate time points in response to the scanning.

The display controller 140 may be a timing controller used in typical display technology, or may be a control device including a timing controller and performing other control functions The display controller 140 may be provided as a component separate from the data driver circuit 120, or may be combined with the data driver circuit 120 to form an integrated circuit (IC).

The data driver circuit 120 may be implemented to include one or more source driver integrated circuits (SDICs).

Each of the source driver integrated circuits may include a shift register, a latch circuit, a digital-to-analog converter (DAC), an output buffer, and the like, and in some cases, may further include an analog-to-digital converter (ADC).

The gate driver circuit 130 may be implemented to include one or more gate driver integrated circuits (GDICs).

Each of the gate driver integrated circuits may include a shift register, a level shift, and the like.

The data driver circuit 120 may be located on one side of the display panel 110 (e.g., on the upper or lower portion of or above or below the display panel 110), and in some cases, may be located on both sides of the display panel 110 (e.g., on the upper and lower portions of or above and below the display panel 110), depending on the driving method, the design of the display panel, or the like.

The gate driver circuit 130 may be located on one side (e.g., on the right or left portion or to the right or left) of the display panel 110, and in some cases, may be located on both sides (e.g., on the right and left portions or to the right and left) of the display panel 110.

In addition, the display panel 110 may be various types of display panels such as a liquid crystal display panel, an electroluminescent display panel, and a plasma display panel.

Figure 3:
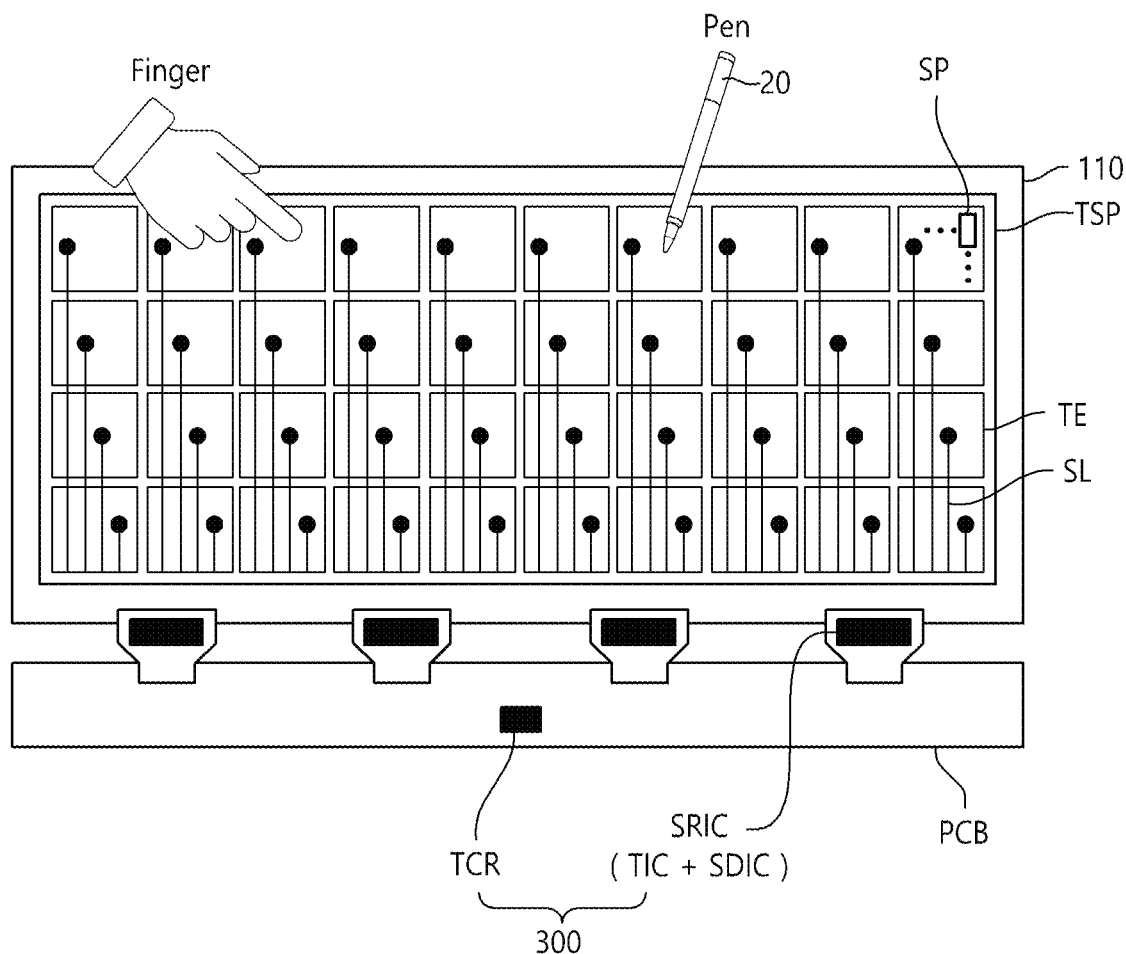
FIG. 3 illustrates an example of the touch display device according to embodiments.

FIG. 3 illustrates an example of the touch display device 10 according to embodiments.

FIG. 3 illustrates a case in which a touchscreen panel TSP is embedded in the display panel 110.

Referring to FIG. 3, a touch circuit 300 may include one or more touch driver circuits TIC to supply a touch driving signal to the touchscreen panel TSP and detecting (receiving) a touch sensing signal from the touchscreen panel TSP, a touch controller TCR to determine the presence and/or the position of a touch input using a detection result of the touch sensing signal of the touch driver circuits TIC, and the like.

Each of the one or more touch driver circuits TIC included in the touch circuit 300 may be implemented as a single integrated circuit (IC).

In addition, the one or more touch driver circuits TIC included in the touch circuit 300 may be implemented as one or more integrated circuits SRIC together with one or more source driver integrated circuits SDIC forming the data driver circuit 120.

That is, the touch display device 10 may include one or more integrated circuits SRIC, each of which may include the touch driver circuits TIC and the source driver integrated circuits SDIC.

As described above, by the integrated implementation of the touch driver circuits TIC for touch driving and the source driver integrated circuit SDIC for data driving, touch driving and data driving may be effectively performed when the touchscreen panel TSP is an internal type embedded in the display panel 110 and when signal lines SL connected to touch electrodes TE are arranged in parallel to the data lines DL.

In addition, when the touchscreen panel TSP is an internal type embedded in the display panel 110, each of the touch electrodes TE may be variously implemented. When the self-capacitance method is applied, the touch electrodes TE may have the arrangement of the touch electrodes TE shown in FIG. 3. When the mutual-capacitance method is applied, the touch electrodes TE may have the arrangement of the touch electrodes TE shown in FIG. 4.

When the touch display device 10 is implemented as a liquid crystal display or the like, a number of common electrodes to which a common voltage is supplied during a display driving period for displaying images may be divided into blocks which may be used as touch electrodes TE. For example, the touch electrodes TE may be applied during a touch driving period for touch sensing when a touch driving signal is supplied or a touch sensing signal is detected, and a common voltage may be supplied during the display driving period for displaying images.

In this case, during the display driving period, all of the touch electrodes TE may be electrically connected inside the touch circuit 300, and may have a common voltage commonly supplied thereto.

During the touch driving period, one or all of the touch electrodes TEs inside the touch circuit 300 may be selected, and the selected one or more touch electrodes TEs may have a touch driving signal supplied thereto from the touch driver circuits TIC of the touch circuit 300, or a touch sensing signal may be detected by the touch driver circuits TIC of the touch circuit 300.

In addition, each of the touch electrodes TE may have a plurality of slits to form an electric field with a plurality of pixel electrodes in a plurality of overlapping subpixels. The slits may be referred to as holes.

On the other hand, when the touch display device 10 is implemented as an organic light-emitting display, the plurality of touch electrodes TE and the plurality of signal lines SL may be located on an encapsulation layer disposed on a common electrode (e.g., a cathode) disposed on the front of the display panel 110 and to which a common voltage is supplied.

Here, the common electrode disposed on the front of the display panel 110 may be, for example, a cathode of an organic light-emitting diode (OLED) in each of the subpixels SP, the OLED including an anode (corresponding to a pixel electrode) and the cathode, and the common voltage may be a cathode voltage.

In this case, each of the plurality of touch electrodes TE may be a type of an electrode having no open area. In this case, each of the plurality of touch electrodes TE may be a transparent electrode for light emission from the subpixel SP. The open area may be referred to as an opening.

Alternately, each of the plurality of touch electrodes TE may be a mesh type electrode having a plurality of open areas. In this case, each of the open areas in each of the plurality of touch electrodes TE may correspond to a light-emitting area of the subpixel SP (e.g., an area of the subpixel SP in which a portion of the anode is located).

On the other hand, during the touch driving period, when a panel driving signal is supplied to the touch electrodes TE and the signal lines SL, a signal identical or corresponding to the panel driving signal may be supplied to other electrodes and signal lines that may be unrelated to touch sensing. Here, the panel driving signal may be referred to as a touch driving signal output from the touch circuit 300 to sense a touch input by the finger and/or the pen 20 or to recognize the pen information from the pen 20.

For example, during the touch driving period, a panel driving signal or a corresponding signal may be supplied to some or all of the data lines DL.

In another example, during the touch driving period, a panel driving signal or a corresponding signal may be supplied to some or all of the gate lines GL.

In another example, during the touch driving period, a panel driving signal or a corresponding signal may be supplied to all of the touch electrodes TE.

In addition, in embodiments of the present disclosure, the panel driving signal may refer to any signal supplied to the touchscreen panel TSP, the display panel 110, or the display panel 110 having the touchscreen panel TSP embedded therein.

With respect to the implementation and placement position of the integrated circuit, in an example, in the touch display device 10, the integrated circuit SRIC may be mounted on a film, one end of the film may be connected to the touchscreen panel TSP, and the other end of the film may be connected to a printed circuit board PCB to electrically connect the touch driver circuits TIC and the source driver integrated circuits SDIC to the display panel 110. In this case, the integrated circuit SRIC may be referred to as a chip-on-film (COF) structure.

The touch controller TCR may be mounted on the printed circuit board PCB connected to a film on which the integrated circuit SRIC is mounted.

On the other hand, the integrated circuit SRIC may also be implemented as a chip-on-glass (COG) structure bonded to the surface of the touchscreen panel TSP.

In addition, the one or more touch driver circuits TIC and the touch controller TCR of the touch circuit 300 may be integrated into a single component.

Figure 4:
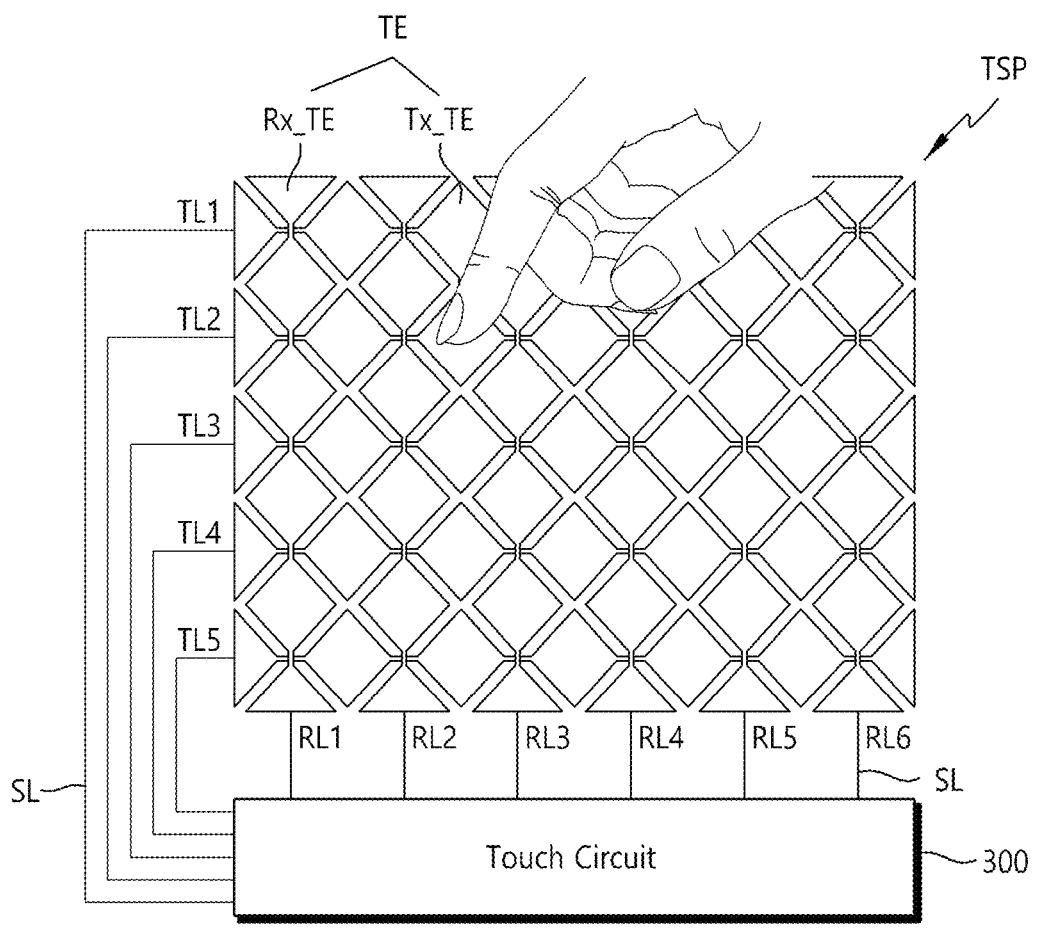
FIG. 4 illustrates an example of the touch sensing part for mutual-capacitance based touch sensing in the touch display device according to embodiments.

FIG. 4 illustrates an example of the touch sensing part for mutual-capacitance based touch sensing in the touch display device according to embodiments.

Referring to FIG. 4, the touch display device 10 may sense the presence or absence of a touch or the position of the touch by the finger and/or the pen 20 with a capacitance-based touch sensing technique.

In this regard, as shown in FIG. 4, the touch display device 10 may include the touchscreen panel TSP on which the plurality of touch electrodes TE are disposed and the touch circuit 300 driving the touchscreen panel TSP.

The touch display device 10 may provide a mutual-capacitance based touch sensing function sensing a touch input by measuring capacitance generated between two touch electrodes Tx_TE and Rx_TE or a change thereof.

Referring to FIG. 4, for mutual-capacitance based touch sensing, first touch electrode lines TL1 to TL5 to which a touch driving signal is supplied and second touch electrode lines RL1 to RL6 sensing a touch sensing signal may be arranged on the touchscreen panel TSP. The first touch electrode lines may be referred to as touch driving lines. The second touch electrode lines may be referred to as touch sensing lines.

Each of the first touch electrode lines TL1 to TL5 may be a single rod-shaped electrode extending in the transverse direction, and each of the second touch electrode lines RL1 to RL6 may be a single rod-shaped electrode extending in the longitudinal direction.

In another example, as shown in FIG. 4, each of the first touch electrode lines TL1 to TL5 may be formed by electrically connecting first touch electrodes Tx_TE disposed in the same row, and each of the second touch electrode lines RL1 to RL6 may be formed by electrically connecting second touch electrodes Rx_TE disposed in the same column. The first touch electrodes Tx_TE may be referred to as transmitting touch electrodes Tx_TE or touch driving electrodes. The second touch electrodes Rx_TE may be referred to as receiving touch electrodes Rx_TE or touch sensing electrodes. However, these are illustrative only, and the second touch electrodes Rx_TE may be the transmitting touch electrodes Tx_TE or the touch driving electrodes and the first touch electrodes Tx_TE may be the receiving touch electrodes Rx_TE or the touch sensing electrodes.

For example, a touch driving signal for detecting a finger touch generated by the touch circuit 300 may be supplied to the touch driving electrodes. A touch sensing signal generated based on a capacitance change between the touch driving electrodes and the touch sensing electrodes by the finger touch may be supplied to the touch circuit 300 through the touch sensing lines from the touch sensing electrodes.

Each of the first touch electrode lines TL1 to TL5 may be electrically connected to the touch circuit 300 through the one or more signal lines SL. Each of the second touch electrode lines RL1 to RL6 may be electrically connected to the touch circuit 300 through the one or more signal lines SL. The signal lines SL may include the first touch electrode lines TL1 to TL5 and the second touch electrode lines RL1 to RL6.

The geometry of a single touch electrode TE shown in FIG. 4 is illustrative only, and the touch electrode TE may be designed in various manners.

In addition, the size of the area in which a single touch electrode TE is provided may correspond to the size of the area in which a single subpixel is provided.

Alternately, the size of the area in which a single touch electrode TE is provided may be larger than the size of the area in which a single subpixel is provided. In this case, a single touch electrode TE may overlap two or more data lines and two or more gate lines.

For example, the size of the area in which a single touch electrode TE is provided may correspond to the size of an area of several to tens of subpixels.

In addition, the touchscreen panel TSP may be an external touchscreen panel that is fabricated separately from the display panel 110 and coupled to the display panel 110, or may be an embedded touchscreen panel that is embedded in the display panel 110. The external touchscreen panel may also be referred to as an add-on touchscreen panel, and the embedded touchscreen panel may be referred to as an in-cell touchscreen panel, an on-cell touchscreen panel, or the like.

When the touchscreen panel TSP is embedded in the display panel 110, during fabrication of the display panel 110, the touch electrodes TE may be formed together with other electrodes or signal lines related to display driving.

Figure 5:
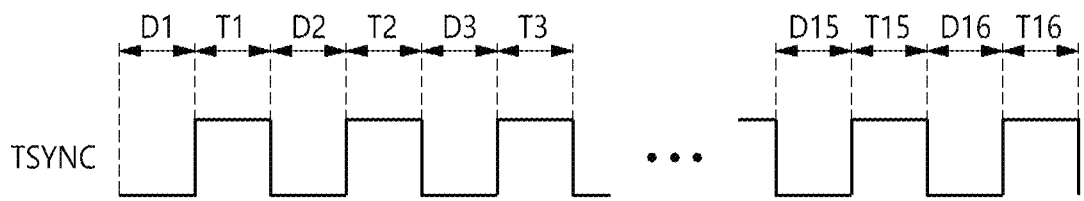
FIG. 5 is a driving timing diagram illustrating a time-sharing driving method of display driving and touch driving of the touch display device according to embodiments.

FIG. 5 is a driving timing diagram illustrating a time-sharing driving method of display driving and touch driving of the touch display device 10 according to embodiments.

Referring now to FIG. 5, the touch display device 10 according to embodiments may perform "display driving" for displaying images and "touch driving" for sensing a touch by the finger and/or the pen 20 (e.g., a finger touch and/or a pen touch) in a time-sharing manner.

In the touch display device 10, display driving periods D and touch driving periods T are alternately assigned.

During the display driving periods D, the display driving is performed to display images. During the touch driving periods T, the touch driving (e.g., finger touch driving and/or the pen touch driving) is performed to sense a finger touch or a pen touch.

In such a time-sharing driving method, the touch driving periods T may be blank periods where no display driving is performed.

On the other hand, the touch display device 10 may generate a synchronization signal TSYNC swinging between a high level and a low level and identify or control the display driving periods D and the touch driving periods T using the synchronization signal TSYNC. That is, the synchronization signal TSYNC is a driving timing control signal defining the touch driving periods T.

For example, high-level segments (or low-level segments) of the synchronization signal TSYNC may indicate the touch driving periods T, and low-level segments (or high-level segments) of the synchronization signal TSYNC may indicate the display driving periods D.

On the other hand, a single display frame period may include a single display driving period and a single touch driving period. In this case, after a single display frame screen is displayed, the touch driving may be performed.

In another example, a single display frame period may include two or more display driving periods and two or more touch driving periods.

For example, referring to FIG. 5, a single display frame period may include 16 display driving periods (D1 to D16) and 16 touch driving periods (T1 to T16). In this case, a single display frame screen may be divided into ¹⁄₁₆ths, and the touch driving may be performed therebetween.

Figure 6:
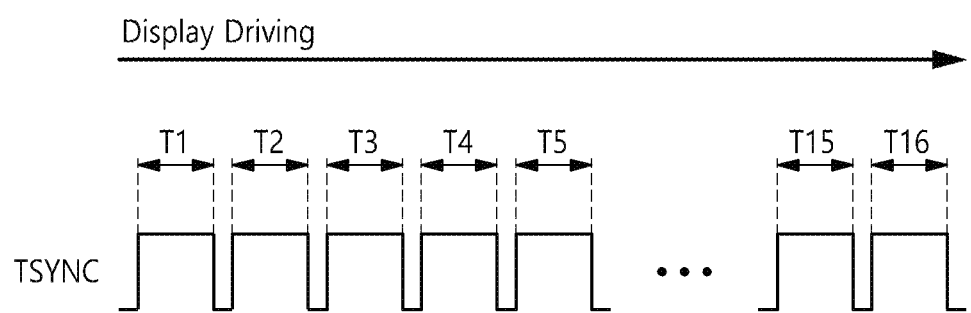
FIG. 6 is a driving timing diagram illustrating an independent driving method of display driving and touch driving of the touch display device according to embodiments.

FIG. 6 is a driving timing diagram illustrating an independent driving method of display driving and touch driving of the touch display device 10 according to embodiments.

Referring to FIG. 6, the touch display device 10 according to embodiments may independently perform "display driving" for displaying images and "touch driving" for sensing a touch by the finger and/or the pen 20 (e.g., a finger touch and/or a pen touch).

In this case, as shown in FIG. 6, the display driving and the touch driving may be performed in different times divided in a time-sharing manner or may be performed concurrently (or in some embodiments, simultaneously). Alternately, the display driving and the touch driving may be performed in different divided times and then concurrently (or in some embodiments, simultaneously) at some time points.

When the display driving and the touch driving are performed independently, the touch driving may be performed independently of the display driving, and vice versa.

In the touch display device 10, display driving periods D and touch driving periods T are alternately assigned.

For example, when the display driving and the touch driving are performed concurrently (or in some embodiments, simultaneously), the touch driving may be performed to sense a finger touch or a pen touch while an image is being displayed according to the display driving.

When the display driving and the touch driving are performed independently, the display driving periods may be controlled by a conventional display driving control signal (e.g., a vertical synchronization signal Vsync). The touch driving period may be controlled by a synchronization signal TSYNC.

In this case, the synchronization signal TSYNC may only define the touch driving periods T, in contrast to the synchronization signal TSYNC in FIG. 6, which separately defines the display driving periods D and the touch driving periods T.

For example, the periods during which the synchronization signal TSYNC is at a high level (or low level) may indicate the touch driving periods T during which the touch driving is performed, and the periods during which the synchronization signal TSYNC is at a low level (or high level) may indicate the periods during which the touch driving is not performed.

In addition, during a single high-level period (or low-level period), e.g., during a single touch driving period, in the synchronization signal TSYNC, the finger touch and/or the pen touch may be sensed once over the entire screen area. In this case, the single touch driving period may correspond to a single touch frame period.

In another example, during two or more high-level periods (or low-level periods), e.g., during two or more touch driving periods, in the synchronization signal TSYNC, the finger touch and/or the pen touch may be sensed once over the entire screen area. In this case, two or more touch driving periods may correspond to a single touch frame period.

For example, during 16 high-level periods (or low-level periods), e.g., 16 touch driving periods, of the synchronization signal TSYNC, the finger touch and/or the pen touch may be sensed once over the entire screen area. In this case, the 16 touch driving periods may correspond to a single touch frame period.

In each of the touch driving periods T, finger touch driving may be performed to sense a finger touch, or the pen touch driving may be performed to sense a pen touch.

In addition, the touchscreen panel TSP may be embedded in the display panel 110 or may be present outside the display panel 110. For ease of explanation, the touchscreen panel TSP will be described below using an example of the touchscreen panel TSP embedded in display panel 110, and the touchscreen panel TSP will also be referred to simply as the panel TSP.

Figure 7:
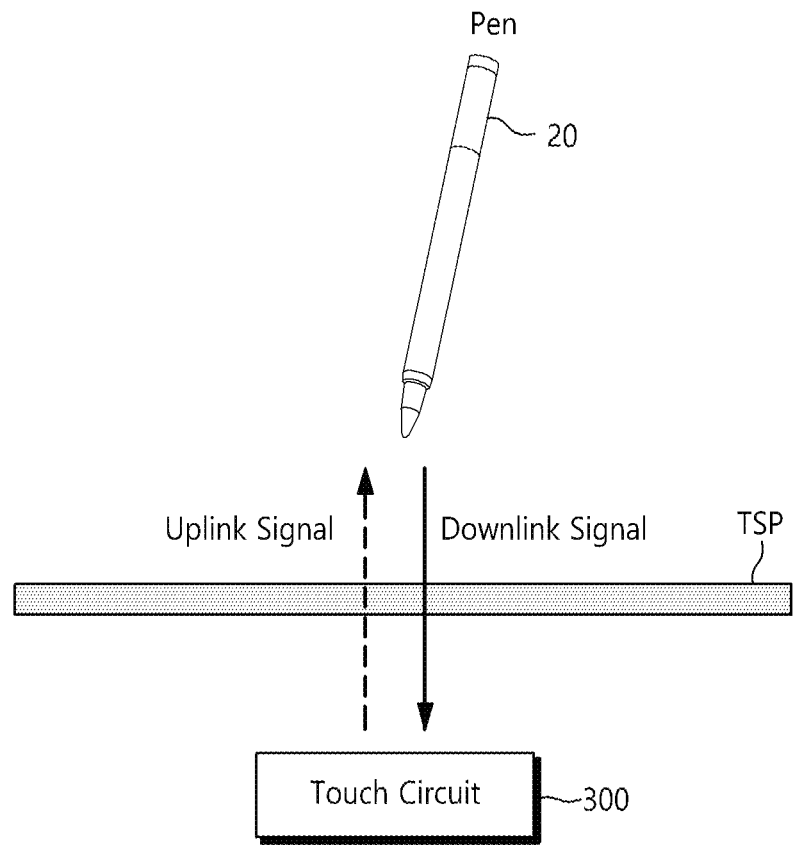
FIG. 7 illustrates a touch driving operation between the touch display device and the pen according to embodiments.

FIG. 7 illustrates a touch driving operation between the touch display device 10 and the pen 20 according to embodiments.

In the case of the pen driving to sense a pen touch, the touch circuit 300 of the touch display device 10 exchanges signals with the pen 20 via the touchscreen panel TSP.

A signal that is fed from the touch circuit 300 to the touchscreen panel TSP and transferred to the pen 20 through the touchscreen panel TSP is referred to as an uplink signal, and a signal that is output from the pen 20 to the touchscreen panel TSP and transferred to the touch circuit 300 through the touchscreen panel TSP is referred to as a downlink signal.

The method, timing, and the like for transmitting and receiving signals between the touch display device 10 and the pen 20 for the pen touch driving and resultant the pen touch sensing, the formats of the signals transmitted and received, and the like are predefined as protocols, and such protocols may be implemented as programs or code or data related to the execution of the programs and stored in or executed by the touch circuit 300 and the pen 20.

For the pen touch driving to sense a pen touch, the touch display device 10 may provide an uplink signal to the pen 20. The uplink signal includes various information necessary to define the linked operation between the touch display device 10 and the pen 20, to control the driving operation of the pen 20, or to drive the pen 20.

More specifically, the touch circuit 300 of the touch display device 10 supplies an uplink signal to one or more of the plurality of touch electrodes TEs included in the touchscreen panel TSP. Accordingly, the pen 20 adjacent to the touchscreen panel TSP may receive the uplink signal through one or more of the plurality of touch electrodes TEs included in the touchscreen panel TSP.

In response to the uplink signal transmitted from the touch display device 10, the pen 20 may output a downlink signal enabling the touch circuit 300 to sense the pen coordinates (also referred to as position) and/or a pen tilt (also briefly referred to as tilt) with respect to the pen 20.

Alternatively, the pen 20 may output a downlink signal indicating various additional information or the like in response to the uplink signal transmitted by the touch display device 10.

As described above, the downlink signal output from the pen 20 may be supplied to one or more of the plurality of touch electrodes TE included in the touchscreen panel TSP.

The touch circuit 300 of the touch display device 10 may receive a downlink signal output from the pen 20 through the one or more touch electrodes TE, and based on the received downlink signal, sense the pen coordinates and/or the pen tilt of the pen 20 and/or recognize various additional information about the pen 20.

The uplink signal referred to above may include, for example, a beacon, a ping signal, or the like.

The beacon is a control signal defining the linked operation between the touch display device 10 and the pen 20, controls the driving operation of the pen 20, or includes various information necessary for the driving operation of the pen 20.

For example, the beacon may include one or more of panel information (e.g., panel state information, panel identification information, and panel type information such as in-cell type), panel driving mode information (e.g., mode identification information such as a pen search mode and a pen mode), downlink signal characteristic information (e.g., a frequency or the number of pulses), driving timing related information, multiplexer driving information, power mode information (e.g., LHB information where the panel and the pen are not driven to reduce power consumption), and the like, and may further include information for synchronizing the driving between the display touchscreen panel TSP and the pen 20.

The ping signal may be a synchronization control signal for synchronization of the downlink signal.

Additional information that may be included in the downlink signal may include, for example, one or more of the pen pressure, the pen ID, button information, battery information, information for checking and correcting information errors, and the like.

Figure 8:
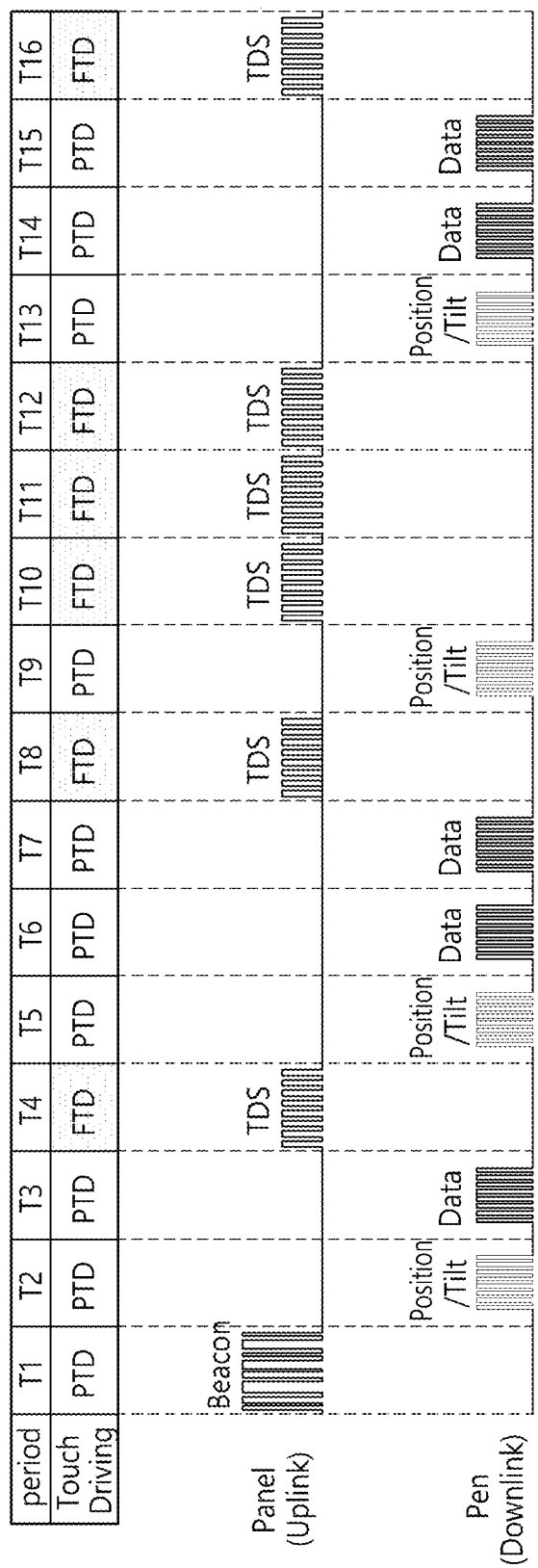
FIG. 8 illustrates an example of driving timing of the touch driving operation between the touch display device and the pen according to embodiments.

FIG. 8 illustrates an example of driving timing of the touch driving operation between the touch display device 10 and the pen 20 according to embodiments.

In the example of FIG. 8, 16 touch driving periods T1 to T16 are regularly repeated. In this case, the 16 touch driving periods T1 to T16 may be referred to as a single touch frame period, and both the finger touch and the pen touch may be sensed during the single touch frame period.

FIG. 8 illustrates the downlink signal output from the pen 20 and various signals (including uplink signals) supplied by the touch circuit 300 to the touchscreen panel TSP according to the timing specified by the protocol.

Referring to FIG. 8, during the single touch frame period corresponding to the 16 touch driving periods T1 to T16, a beacon, e.g., one of the uplink signals, may be transmitted from the touchscreen panel TSP to the pen 20 at least once or twice, and a beacon transmission period may be one or more protocol selected (or in some embodiments, predetermined) touch driving periods (T1 in the example of FIG. 8) in the 16 touch driving periods T1 to T16. The period during which the beacon is supplied to the touchscreen panel TSP may occur in a blank period where no display driving is performed. However, the period during which the beacon is supplied to the touchscreen panel TSP may also occur during an active period during which the display driving is performed.

The beacon may be transmitted periodically in every single touch frame period, periodically in every two or more touch frame periods, or in random touch frame periods based on the occurrence of a selected (or in some embodiments, predetermined) event.

When the beacon is transmitted from the touchscreen panel TSP to the pen 20, the pen 20 may respond to the beacon and output a downlink signal in selected (or in some embodiments, predetermined) touch driving periods (T2, T3, T5, T6, T7, T9, T13, T14, and T15 in the example of FIG. 8) according to a selected (or in some embodiments, predetermined) protocol.

The downlink signal output from the pen 20 may be a downlink signal enabling the touch display device 10 to sense the pen coordinates (e.g., position) and the pen tilt of the pen 20.

For example, a single downlink signal output from the pen 20 may be a downlink signal enabling the touch display device 10 to sense one of the pen coordinates and the pen tilt of the pen 20, or may be a downlink signal enabling the touch display device 10 to sense both the pen coordinates and the pen tilt of the pen 20.

In addition, the downlink signal output from the pen 20 may be a downlink signal representing data including various additional information of the pen 20. Here, the data includes various additional information of the pen 20. The various additional information may include, for example, the pen pressure, the pen ID, button information, battery information, information for checking and correcting information errors, and the like.

The downlink signal output from the pen 20 may be supplied to one or more of the plurality of touch electrodes TE included in the touchscreen panel TSP.

Referring now to FIG. 8, the 16 touch driving periods T1 to T16 included in the single touch frame period may include one or more touch driving periods T2, T5, T9, and T13 for sensing at least one of the pen coordinates and the pen tilt.

In response to these touch driving periods T2, T5, T9, and T13, the pen 20 may output a downlink signal related to the sensing of one or more of the pen coordinates and the pen tilt.

In this case, the downlink signal may be a signal consisting of pulses periodically swinging between high and low levels.

In addition, with reference to FIG. 8, the 16 touch driving periods T1 to T16 included in the single touch frame period may include one or more touch driving periods T3, T6, T7, T14, and T15 in which data may be sensed.

In accordance with these touch driving periods T3, T6, T7, T14, and T15, the pen 20 may output a downlink signal related to data sensing.

In this case, the downlink signal may be a signal consisting of aperiodic pulses representing additional information included in the data.

As described above, when a downlink signal is output from the pen 20 in accordance with the touch driving periods specified by the protocol, the touch circuit 300 may receive the downlink signal via the touchscreen panel TSP and perform the pen sensing based on the received downlink signal.

Here, performing the pen sensing may include one or more of sensing the pen coordinates, sensing a pen tilt, and recognizing additional the pen information included in the data Data.

On the other hand, the 16 touch driving periods T1 to T16 included in the single touch frame period may include one or more touch driving periods (e.g., T4, T6, T10, T11, T12, and T16) for sensing a finger touch.

During the one or more of these touch driving periods (e.g., T4, T6, T10, T11, T12, and T16), the touch circuit 300 may supply a touch driving signal DS for sensing the finger touch to some or all of the plurality of touch electrodes TE included in the touchscreen panel TSP.

The touch driving signal DS may be a signal swinging between high and low levels. That is, the touch driving signal DS may be a modulated signal having a variable voltage level.

On the other hand, among the touch driving periods T1, T2, T3, T5, T6, T7, T9, T13, T14, and T15 for sensing a pen touch, the touch circuit 300 may supply a DC voltage having a constant voltage level to the touchscreen panel TSP during the remaining touch driving periods T2, T3, T5, T6, T7, T9, T13, T14, and T15 except for the touch driving period T1 corresponding to the beacon transmission period.

Here, the DC voltage may be a low-level voltage, such as the touch driving signal DS or the beacon, a high-level voltage, any voltage between the low-level voltage and the high-level voltage, or a ground voltage.

In FIG. 8, the touch driving performed during the touch driving periods T1, T2, T3, T5, T6, T7, T9, T13, T14, and T15 for sensing the pen touch is referred to as the pen touch driving PD. Further, the touch driving performed during the touch driving periods T4, T6, T10, T11, T12, and T16 for sensing the finger touch is referred to as finger touch driving FD.

Figure 9:
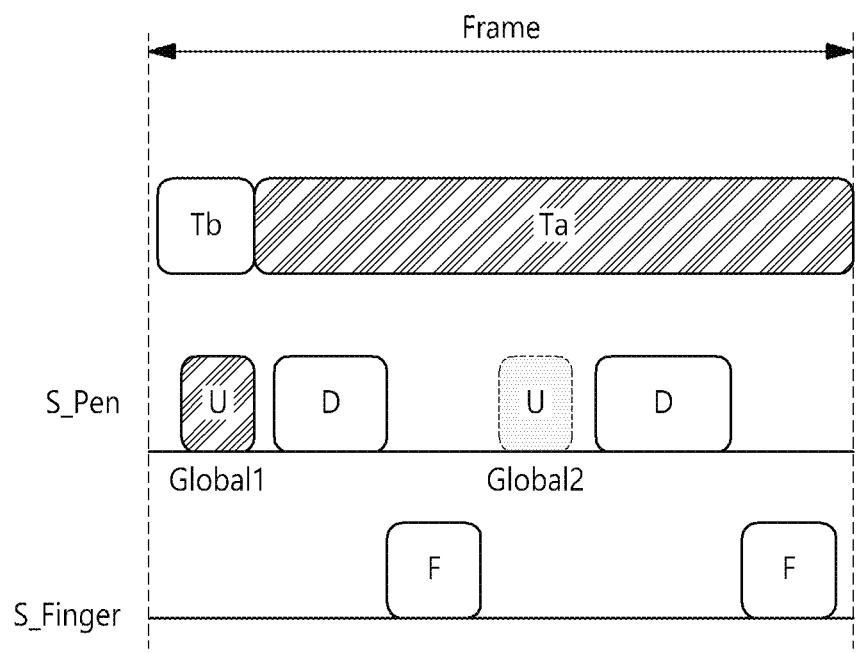
FIG. 9 illustrates the pen touch driving and finger touch driving performed during a single frame period according to embodiments.

FIG. 9 illustrates the pen touch driving and finger touch driving performed during a single frame period Frame according to embodiments.

Figure 10:
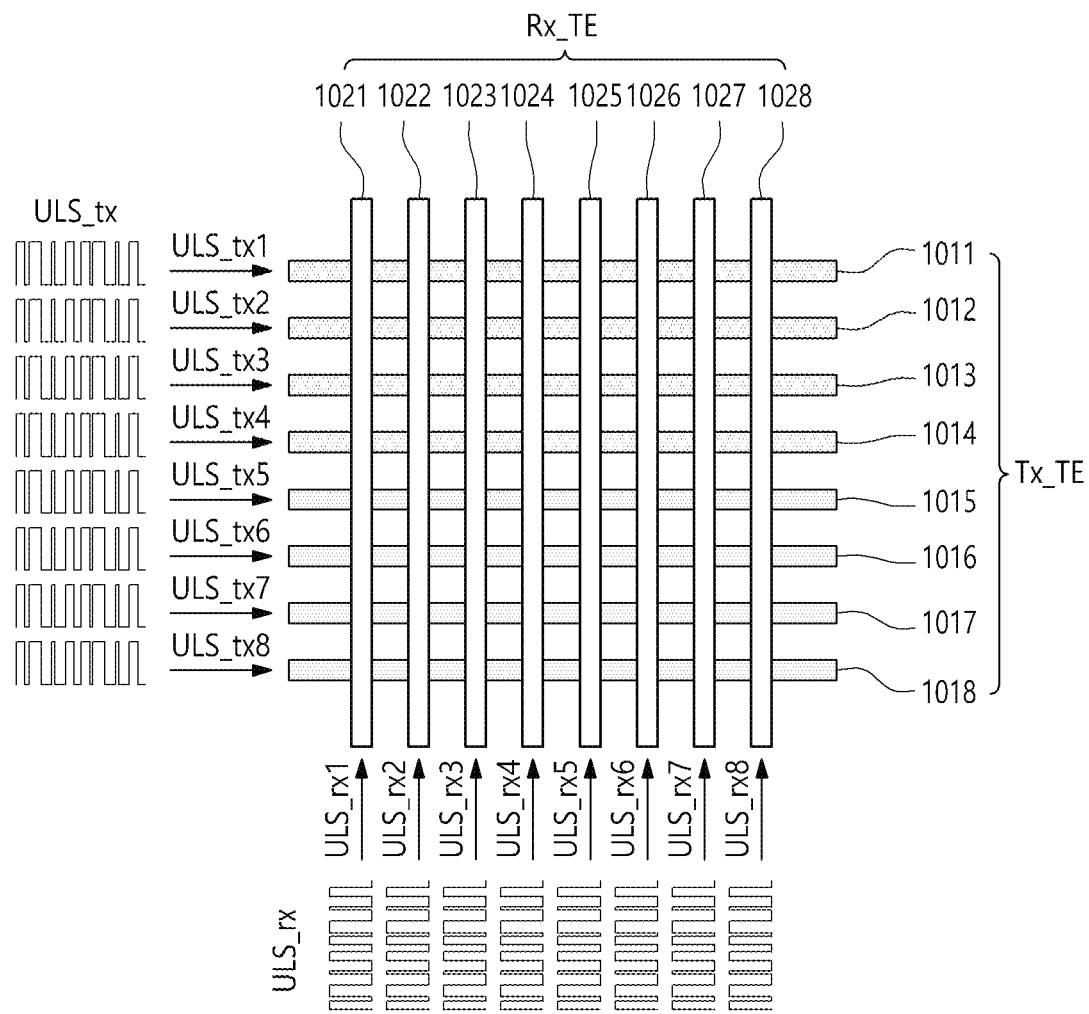
FIG. 10 illustrates an uplink signal supplied to the touch electrodes according to embodiments.

FIG. 10 illustrates an uplink signal U supplied to the touch electrodes TE according to embodiments.

Figure 11:
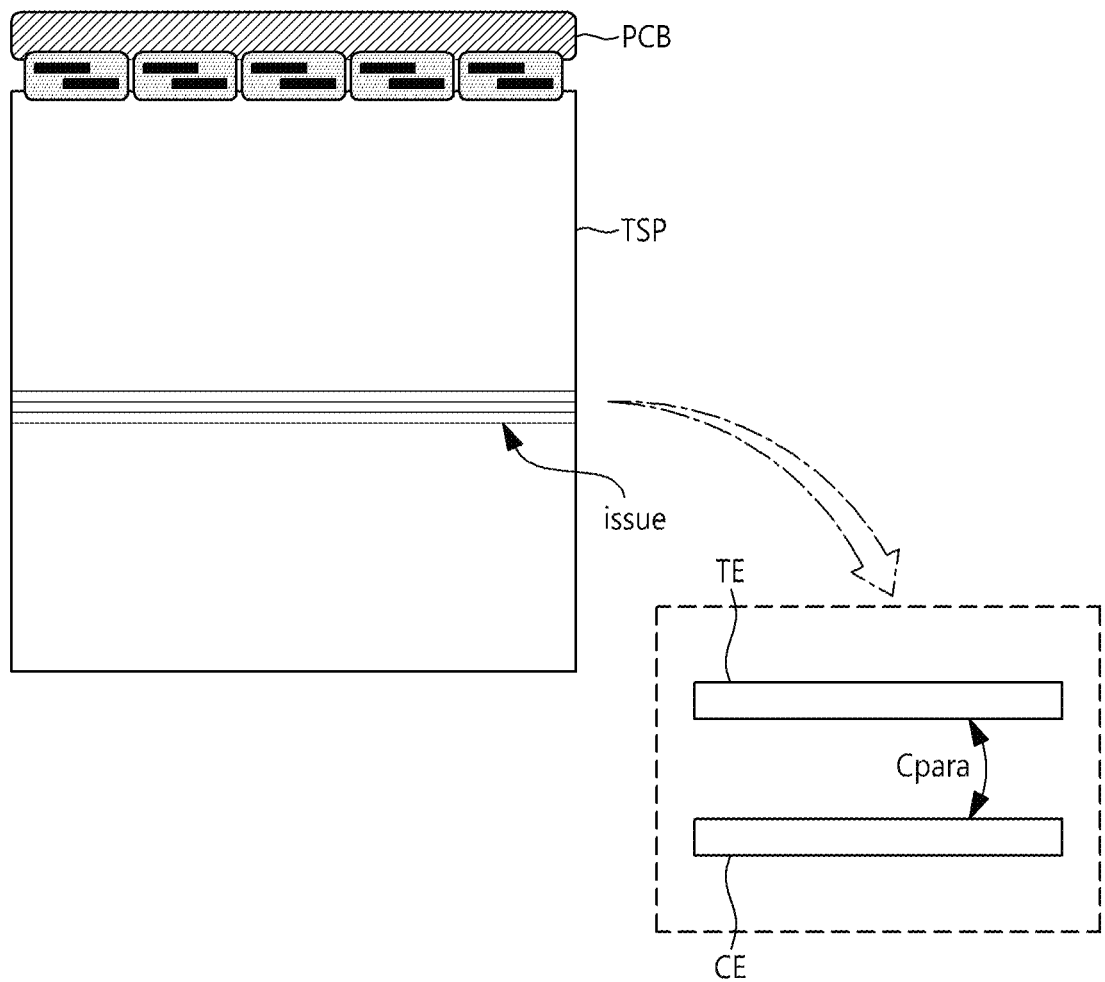
FIG. 11 illustrates an issue appearing in the display panel according to embodiments.

FIG. 11 illustrates an issue appearing in the display panel 110 according to embodiments.

Referring to FIG. 9, the single frame period Frame may include an active period Ta and a blank period Tb. The active period Ta may correspond to the display driving period, and the blank period Tb may correspond to a period in which the display driving is not performed.

A pen signal S_Pen may include an uplink signal U and a downlink signal D.

During the blank period Tb, the uplink signal U from the touch circuit 300 may be supplied to the touchscreen panel TSP. When the uplink signal U is supplied to the entire touchscreen panel TSP concurrently (or in some embodiments, simultaneously), this may be referred to as global driving. When the uplink signal U is supplied to a portion of the touchscreen panel TSP, this may be referred to as local driving.

During the active period Ta, the downlink signal D from the pen 20 may be supplied to the touchscreen panel TSP.

A finger signal S_Finger may include a finger touch driving signal F.

During the active period Ta, the finger touch driving signal F from the touch circuit 300 may be supplied to the touchscreen panel TSP.

When the touch display device 10 is operating at 120 Hz, the duration of one frame may be 8.3 ms. In this case, the active period Ta may be 7.96 ms, and the blank period Tb may be 0.34 ms.

When the touch display device 10 is driven at 120 Hz, the pen signal S_Pen may be synchronized to 240 Hz and supplied to the touchscreen panel TSP. Because the uplink signal U is supplied during the blank period Tb, the period during which the uplink signal U is supplied may be less than 0.34 ms.

When the touch display device 10 is driven at 120 Hz, the finger signal S_Finger may be synchronized to 240 Hz and supplied to the touchscreen panel TSP. The period during which the finger signal S_Finger is supplied during the active period Ta may be 1.2 ms.

Here, a driving operation of supplying the uplink signal U during the blank period Tb may be referred to as first global driving Global1, and a driving operation of supplying the uplink signal U during the active period Ta may be referred to as second global driving Global2.

Referring to FIG. 10, the touch electrodes TE shown in FIG. 10 may be the same as the touch electrodes TE shown in FIG. 4.

Referring to FIG. 10, the transmitting touch electrodes Tx_TE may include first to eighth transmitting electrodes 1011 to 1018. The receiving touch electrodes Rx_TE may include first to eighth receiving electrodes 1021 to 1028.

Uplink signals ULS_tx for a plurality of transmitting electrodes may be supplied to the transmitting touch electrodes Tx_TE. An uplink signal for an ath transmitting electrode (where a is a natural number) may be supplied to an ath transmitting electrode. For example, an uplink signal ULS_tx1 for the first transmitting electrode may be supplied to the first transmitting electrode 1011, and an uplink signal ULS_tx8 for the eighth transmitting electrode may be supplied to the eighth transmitting electrode 1018. The same uplink signals ULS_tx for a plurality of transmitting electrodes may be supplied to the first to eighth transmitting electrodes 1011 to 1018.

Uplink signals ULS_rx for a plurality of receiving electrodes may be supplied to the receiving touch electrodes Rx_TE. An uplink signal for an ath receiving electrode may be supplied to an ath receiving electrode. For example, an uplink signal ULS_rx1 for a first receiving electrode may be supplied to the first receiving electrode 1021, and an uplink signal ULS_rx8 for an eighth receiving electrode may be supplied to the eighth receiving electrode 1028. The same uplink signals ULS_rx for a plurality of receiving electrodes may be supplied to the first to eighth receiving electrodes 1021 to 1028.

The uplink signals ULS_tx for a plurality of transmitting electrodes may be alternating-current (AC) signals. The uplink signals ULS_tx for a plurality of transmitting electrodes may be signals alternating between a high voltage level and a low voltage level. The uplink signals ULS_tx for a plurality of transmitting electrodes may be signals in which a high voltage level is maintained for a first period and a low voltage level is maintained for a second period. The length of the first period and the length of the second period may be different, but depending on the design, the length of the first period and the length of the second period may be the same. The uplink signals ULS_rx for a plurality of receiving electrodes may be the same as the uplink signals ULS_tx for a plurality of transmitting electrodes. The uplink signals ULS_tx for a plurality of transmitting electrodes and the uplink signals ULS_rx for a plurality of receiving electrodes may be included in the uplink signal U illustrated in FIG. 9.

The display driving period and the uplink signal transmission period may be driven in different time periods, which may be referred to as "time-sharing driving". The display driving period and the uplink signal transmission period may be driven independently of each other in time, which may be referred to as "concurrent driving".

When the display driving period and the uplink signal transmission period are driven in a time-sharing manner, the uplink signal U may be supplied to the touchscreen panel TSP during the blank period Tb. In a case in which the display driving period and the uplink signal transmission period are driven in a time-sharing manner, the display driving period and the uplink signal transmission period are performed in separate periods, so that the uplink signal U may not affect the display driving.

Referring to FIG. 9, when the display driving period and the uplink signal transmission period are driven in a time-sharing manner, the uplink signal U may be supplied to the touchscreen panel TSP through the first global driving Global1. When the uplink signal U is supplied to the touchscreen panel TSP through the first global driving Global1, the uplink signal U may not affect the display driving.

When the display driving period and the uplink signal transmission period are performed concurrently (or in some embodiments, simultaneously), the display driving period and the uplink signal transmission period may be performed independently of each other. Accordingly, the period during which the uplink signal U is supplied to the touchscreen panel TSP may be either the blank period Tb or the active period Ta.

Referring to FIG. 9, when the display driving period and the uplink signal transmission period are performed concurrently (or in some embodiments, simultaneously), the uplink signal U may be supplied to the touchscreen panel TSP via the first global driving Global1 or the second global driving Global2. In the second global driving Global2, the uplink signal U may be supplied to the touchscreen panel TSP during the active period Ta. As the uplink signal U is supplied to the touch electrodes TE, the uplink signal U may affect the display driving.

Referring to FIG. 11, the touch electrodes TE and a cathode CE may be coupled by a parasitic capacitance Cpara. The cathode CE may also be referred to as a common electrode. The uplink signal U supplied to the touch electrodes TE may affect the cathode CE. That is, when the uplink signal U is supplied to the touchscreen panel TSP during the active period Ta, the cathode CE may be affected by the uplink signal U supplied to the touch electrodes TE.

The voltage supplied to the cathode CE may be affected by the uplink signal U supplied to the touch electrodes TE. Fluctuations in the voltage supplied to the cathode CE may affect the data voltage Vdata supplied through the data line DL. Accordingly, referring to FIG. 11, an issue may occur in the display panel 110. The issue appearing in the display panel 110 may be in the form of lines, dots, smudges, or the like. That is, the quality of the display panel 110 may be degraded.

Accordingly, embodiments may provide a touch display device and a driving method for the touch display device able to concurrently (or in some embodiments, simultaneously) perform the pen touch driving and display driving.

Embodiments may provide a touch display device and a driving method for the touch display device able to prevent the pen touch driving from affecting display driving.

Embodiments may provide a touch display device and a driving method for the touch display device able to prevent an issue from appearing in the display panel.

Embodiments may provide a touch display device and a driving method for the touch display device able to improve the pen touch performance.

Embodiments may provide a touch display device and a driving method for the touch display device enabling low power driving by preventing an issue from appearing in the display panel.

Figure 12:
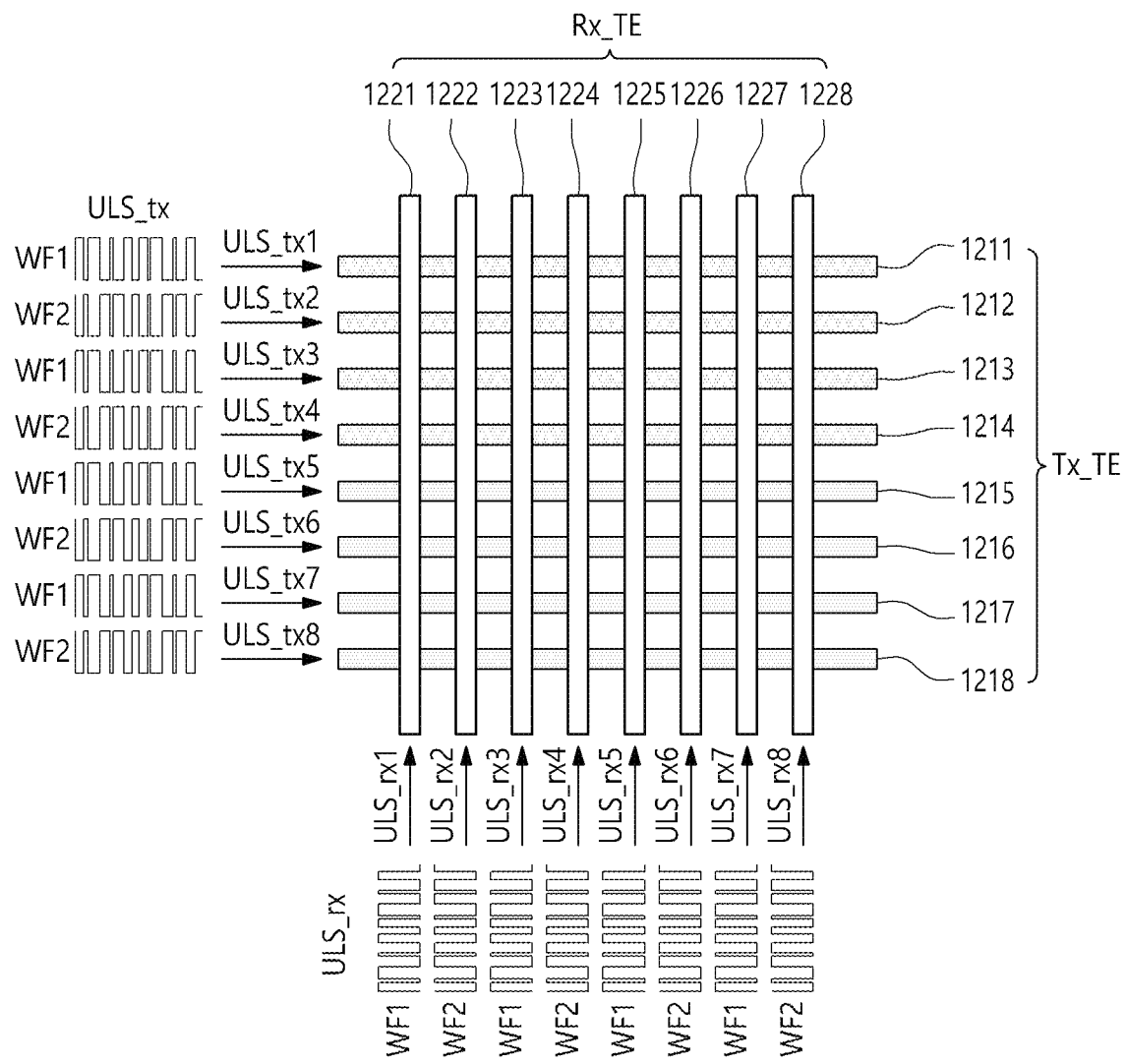
FIG. 12 illustrates an uplink signal supplied to the touch electrodes according to embodiments.

FIG. 12 illustrates an uplink signal U supplied to the touch electrodes TE according to embodiments.

Figure 13:
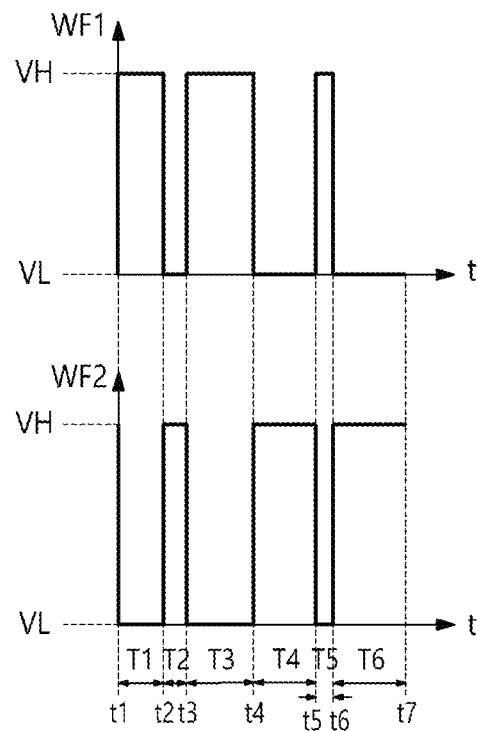
FIGS. 13 and 14 illustrate a first waveform signal and a second waveform signal according to embodiments.
Figure 14:
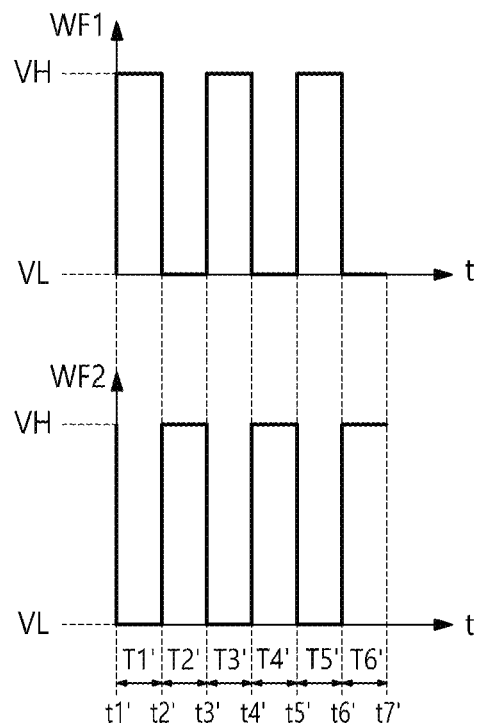

FIGS. 13 and 14 illustrate a first waveform signal and a second waveform signal according to embodiments.

The touch electrodes TE shown in FIG. 12 may be the same as the touch electrodes TE shown in FIG. 10.

Referring to FIG. 12, the transmitting touch electrodes Tx_TE may include a plurality of transmitting electrodes 1210. The plurality of transmitting electrodes 1210 may include first to eighth transmitting electrodes 1221 to 1228. For ease of explanation, the plurality of transmitting electrodes 1210 are shown as eight transmitting electrodes, but the plurality of transmitting electrodes 1210 may include more than eight transmitting electrodes. The plurality of transmitting electrodes 1210 may be touch driving electrodes.

Referring to FIG. 12, the receiving touch electrodes Rx_TE may include a plurality of receiving electrodes 1120. The plurality of receiving electrodes 1120 may include first to eighth receiving electrodes 1221 to 1228. For ease of explanation, the plurality of receiving electrodes 1120 are shown as eight receiving electrodes, but the plurality of receiving electrodes 1120 may include more than eight receiving electrodes. The plurality of receiving electrodes 1120 may be touch sensing electrodes.

Uplink signals ULS_tx for a plurality of transmitting electrodes may be supplied to the transmitting touch electrodes Tx_TE. The uplink signals ULS_tx for a plurality of transmitting electrodes may include uplink signals from an uplink signal ULS_tx1 for the first transmitting electrode to an uplink signal ULS_tx8 for the eighth transmitting electrode.

Uplink signals ULS_rx for a plurality of receiving electrodes may be supplied to the receiving touch electrodes Rx_TE. The uplink signals ULS_rx for a plurality of receiving electrodes may include uplink signals from an uplink signal ULS_rx1 for the first receiving electrode to an uplink signal ULS_rx8 for the eighth receiving electrode.

The uplink signals ULS_tx for a plurality of transmitting electrodes may be AC signals. The uplink signals ULS_tx for a plurality of transmitting electrodes may be a variety of waves such as a sinusoidal wave, a triangular wave, a square wave, and the like. The uplink signals ULS_tx for a plurality of transmitting electrodes may be signals alternating between high and low voltage levels. The uplink signals ULS_tx for a plurality of transmitting electrodes may be signals maintaining a high voltage level for a first period and a low voltage level for a second period. The length of the first period and the length of the second period may be different, but depending on the design, the length of the first period and the length of the second period may be the same. The uplink signals ULS_rx for a plurality of receiving electrodes may be the same as the uplink signals ULS_tx for a plurality of transmitting electrodes.

Referring to FIG. 12, some of the uplink signals ULS_tx for a plurality of transmitting electrodes may be first waveform signals WF1, and the remaining signals of the uplink signals ULS_tx for a plurality of transmitting electrodes may be second waveform signals WF2.

Referring to FIG. 12, some of the uplink signals ULS_rx for a plurality of receiving electrodes may be first waveform signals WF1, and the remaining signals of the uplink signals ULS_rx for a plurality of receiving electrodes may be second waveform signals WF2.

Referring to FIGS. 13 and 14, the first waveform signals WF1 and the second waveform signals WF2 may be in the form of signals inverted with respect to each other. The second waveform signals WF2 may be out-of-phase signals with respect to the first waveform signals WF1.

Referring to FIGS. 13 and 14, the waveforms of the first waveform signals WF1 and the second waveform signals WF2 may be determined by a bit value. For example, when the bit value changes irregularly, the first waveform signals WF1 and the second waveform signals WF2 may be AC signals in which the high voltage level VH and the low voltage level VL alternate at irregular intervals. Further, when the bit value changes regularly, the first waveform signals WF1 and the second waveform signals WF2 may be alternating signals in which the high voltage level VH and the low voltage level VL alternate at regular intervals.

Referring to FIG. 13, the first waveform signals WF1 and the second waveform signals WF2 may be AC signals alternating between a high voltage level and a low voltage level at irregular intervals.

Referring to FIG. 13, during a first period T1, e.g., a period between a first time point t1 and a second time point t2, the first waveform signals WF1 may be at a high voltage level VH and the second waveform signals WF2 may be at a low voltage level VL.

Referring to FIG. 13, during a second period T2, e.g., a period between the second time point T2 and a third time point T3, the first waveform signals WF1 may be at the low voltage level VL and the second waveform signals WF2 may at the high voltage level VH.

Referring to FIG. 13, during a third period T3, e.g., a period between the third time point T3 and a fourth time point T5, the first waveform signals WF1 may be at the high voltage level VH and the second waveform signals WF2 may be at the low voltage level VL.

Referring to FIG. 13, during a fourth period T4, e.g., a period between the fourth time point T4 and a fifth time point T5, the first waveform signals WF1 may be at the low voltage level VL and the second waveform signals WF2 may be at the high voltage level VH.

Referring to FIG. 13, during a fifth time period T5, e.g., a period between the fifth time point T5 and a sixth time point T6, the first waveform signals WF1 may be at the high voltage level VH and the second waveform signals WF2 may be at the low voltage level VL.

Referring to FIG. 13, during the sixth period T6, e.g., a period between the sixth time point T6 and a seventh time point T7, the first waveform signals WF1 may be at the low voltage level VL and the second waveform signals WF2 may be at the high voltage level VH.

Referring to FIG. 13, the first to sixth periods T1 to T6 may have different lengths. That is, the first waveform signals WF1 and the second waveform signals WF2 may be alternating signals alternating between the high voltage level VH and the low voltage level VL at irregular intervals. Further, the first waveform signals WF1 and the second waveform signals WF2 may be in the form of signals inverted with respect to each other.

Referring to FIG. 14, the first waveform signals WF1 and the second waveform signals WF2 may be alternating signals alternating between the high voltage level VH and the low voltage level VL at regular intervals.

Referring to FIG. 14, during a first period T1', e.g., a period between a first time point t1' and a second time point t2', the first waveform signals WF1 may be at the high voltage level VH and the second waveform signals WF2 may be at the low voltage level VL.

Referring to FIG. 14, during a second period T2', e.g., a period between the second time point t2' and a third time point t3', the first waveform signals WF1 may be at the low voltage level VL and the second waveform signals WF2 may be at the high voltage level VH.

Referring to FIG. 14, during a third period T3', e.g., a period between the third time point t3' and a fourth time point t5', the first waveform signals WF1 may be at the high voltage level VH and the second waveform signals WF2 may be at the low voltage level VL.

Referring to FIG. 14, during a fourth period T4', e.g., a period between the fourth time point t4' and a fifth time point t5', the first waveform signals WF1 may be at the low voltage level VL and the second waveform signals WF2 may be at the high voltage level VH.

Referring to FIG. 14, during a fifth period T5', e.g., a period between the fifth time point t5' and a sixth time point t6', the first waveform signals WF1 may be at the high voltage level VH and the second waveform signals WF2 may be at the low voltage level VL.

Referring to FIG. 14, during a sixth period T6', e.g., a period between the sixth time point t6' and the seventh time point t7, the first waveform signals WF1 may be at the low voltage level VL and the second waveform signals WF2 may be at the high voltage level VH.

Referring to FIG. 14, the first to sixth periods T1' to T6' may have the same the lengths. That is, the first waveform signals WF1 and the second waveform signals WF2 may be AC signals in which the high voltage level VH and the low voltage level VL alternate at regular intervals. Further, the first waveform signals WF1 and the second waveform signals WF2 may be in the form of signals inverted with respect to each other.

Referring to FIG. 12, during the uplink signal transmission period, the first waveform signals WF1 and the second waveform signals WF2 may be alternately supplied to the transmitting touch electrodes Tx_TE. Further, during the uplink signal transmission period, the first waveform signals WF1 and the second waveform signals WF2 may be alternately supplied to the receiving touch electrodes Rx_TE.

Referring to FIG. 12, the uplink signals ULS_tx1, ULS_tx3, ULS_tx5, and ULS_tx7 for the odd-numbered transmitting electrodes may be the first waveform signals WF1. During the uplink signal transmission period, the uplink signals ULS_tx1, ULS_tx3, ULS_tx5, and ULS_tx7 for the odd-numbered transmitting electrodes may be supplied to the odd-numbered transmitting electrodes 1211, 1213, 1215, and 1217.

Referring to FIG. 12, the uplink signals ULS_tx2, ULS_tx4, ULS_tx6, and ULS_tx8 for the even numbered transmitting electrodes may be the second waveform signals WF2. During the uplink signal transmission period, the uplink signals ULS_tx2, ULS_tx4, ULS_tx6, and ULS_tx8 for the even numbered transmitting electrodes may be supplied to the even numbered transmitting electrodes 1212, 1214, 1216, and 1218.

Referring to FIG. 12, the uplink signals ULS_rx1, ULS_rx3, ULS_rx5, and ULS_rx7 for the odd-numbered receiving electrodes may be the first waveform signals WFL. During the uplink signal transmission period, the uplink signals ULS_rx1, ULS_rx3, ULS_rx5, and ULS_rx7 for the odd-numbered receiving electrodes may be supplied to the odd-numbered receiving electrodes 1221, 1223, 1225, and 1227.

Referring to FIG. 12, the uplink signals ULS_rx2, ULS_rx4, ULS_rx6, and ULS_rx8 for the even numbered receiving electrodes may be the second waveform signals WF2. During the uplink signal transmission period, the uplink signals ULS_rx2, ULS_rx4, ULS_rx6, and ULS_rx8 for the even numbered receiving electrodes may be supplied to the even numbered receiving electrodes 1212, 1214, 1216, and 1218.

Because the first waveform signals WF1 and the second waveform signals WF2 are alternately supplied to the touch electrodes TE, an issue in which the display driving is affected by the uplink signal U may be prevented.

FIGS. 15 to 22 illustrate an uplink signal U supplied to the touch electrodes TE according to embodiments.

Figure 15:
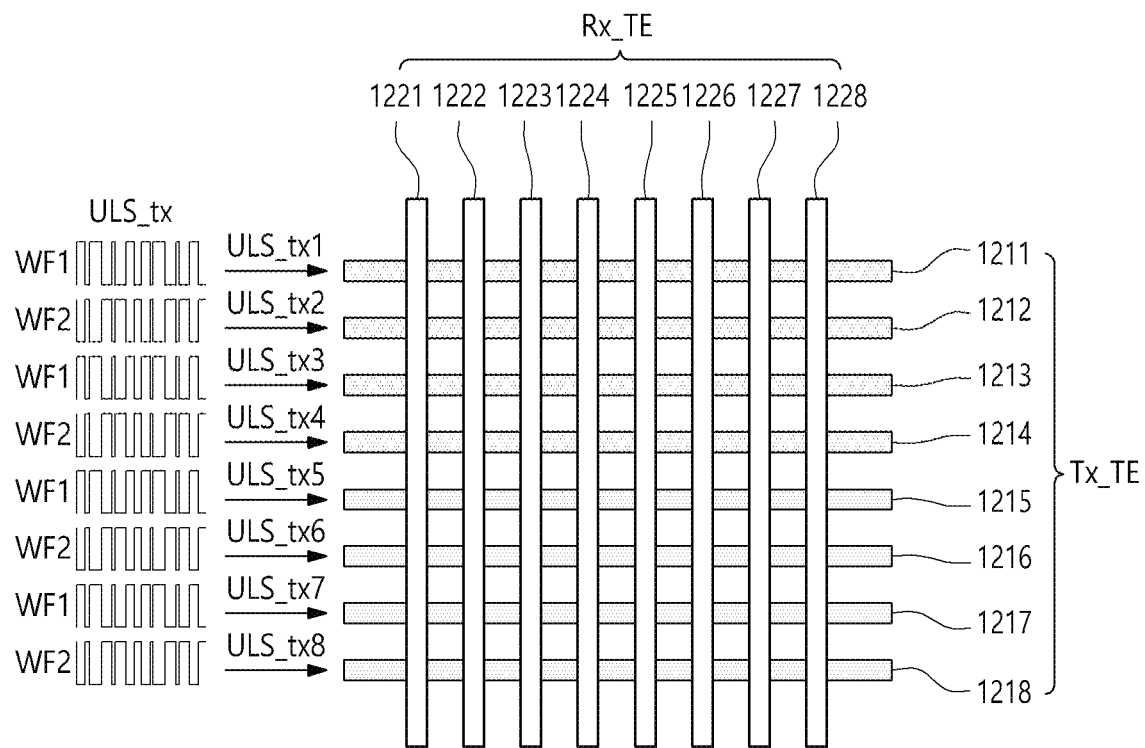
FIGS. 15 to 22 illustrate an uplink signal supplied to the touch electrodes according to embodiments.

Referring to FIG. 15, the display device 100 may be driven by a local driving method.

Referring to FIG. 15, during an uplink signal transmission period, first waveform signals WF1 and second waveform signals WF2 may be alternately supplied to the transmitting touch electrodes Tx_TE. In contrast, during the uplink signal transmission period, a signal other than the uplink signal U may be supplied to the receiving touch electrodes Rx_TE.

Referring to FIG. 15, uplink signals ULS_tx1, ULS_tx3, ULS_tx5, and ULS_tx7 for the odd-numbered transmitting electrodes may be first waveform signals WFL. During the uplink signal transmission period, the uplink signals ULS_tx1, ULS_tx3, ULS_tx5, and ULS_tx7 for the odd-numbered transmitting electrodes may be supplied to the odd-numbered transmitting electrodes 1211, 1213, 1215, and 1217.

Referring to FIG. 15, the uplink signals ULS_tx2, ULS_tx4, ULS_tx6, and ULS_tx8 for the even numbered transmitting electrodes may be second waveform signals WF2. During the uplink signal transmission period, the uplink signals ULS_tx2, ULS_tx4, ULS_tx6, and ULS_tx8 for the even numbered transmitting electrodes may be supplied to the even numbered transmitting electrodes 1212, 1214, 1216, and 1218.

Referring to FIG. 15, the uplink signal U may only be supplied to the transmitting touch electrodes Tx_TE, and a signal other than uplink signal U may be supplied to the receiving touch electrodes Rx_TE. A direct-current (DC) voltage or a ground voltage may be supplied to the receiving touch electrodes Rx_TE, or the receiving touch electrodes Rx_TE may be maintained in a floating state.

Referring to FIG. 15, as the display device 100 is driven by the local driving method, power consumption may be reduced.

Figure 16:
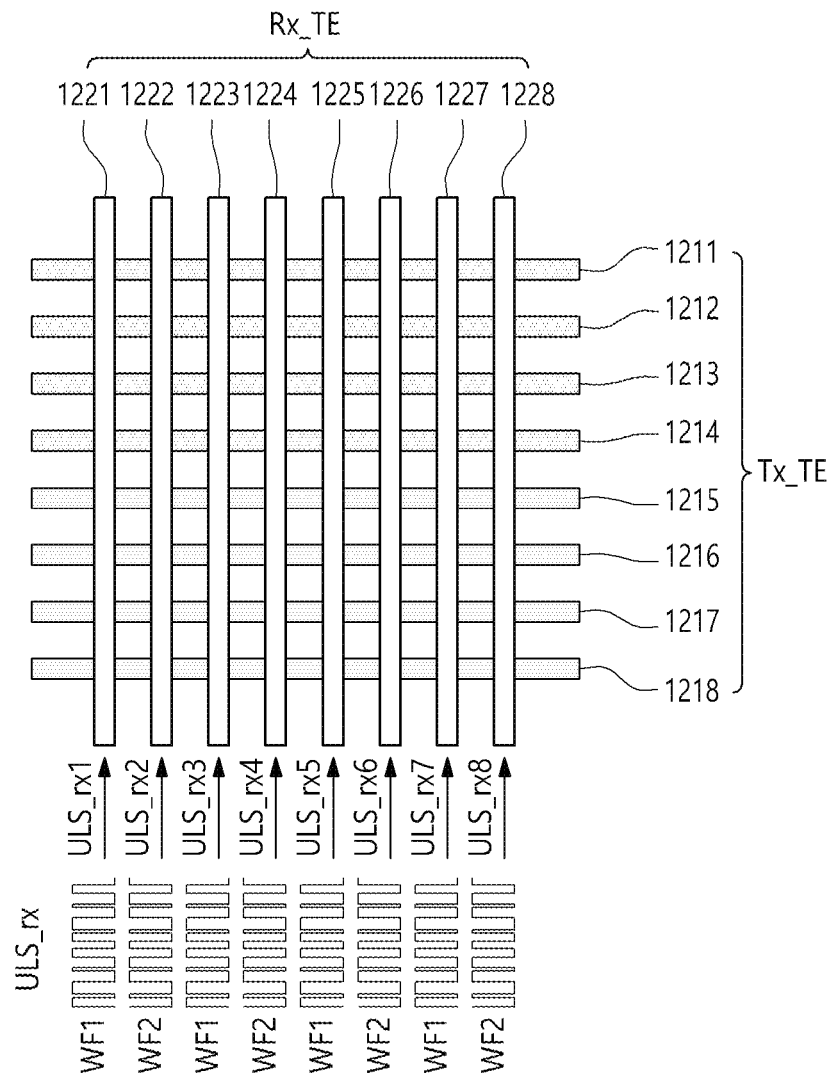

Referring to FIG. 16, the display device 100 may be driven by the local driving method.

Referring to FIG. 16, during the uplink signal transmission period, first waveform signals WF1 and second waveform signals WF2 may be alternately supplied to the receiving touch electrodes Rx_TE. In contrast, during the uplink signal transmission period, a signal other than the uplink signal U may be supplied to the transmitting touch electrodes Tx_TE.

Referring to FIG. 16, the uplink signals ULS_rx1, ULS_rx3, ULS_rx5, and ULS_rx7 for the odd-numbered receiving electrodes may be the first waveform signals WFL. During the uplink signal transmission period, the uplink signals ULS_rx1, ULS_rx3, ULS_rx5, and ULS_rx7 for the odd-numbered receiving electrodes may be supplied to the odd-numbered receiving electrodes 1221, 1223, 1225, and 1227.

Referring to FIG. 16, the uplink signals ULS_rx2, ULS_rx4, ULS_rx6, ULS_rx8 for the even numbered receiving electrode may be the second waveform signals WF2. During the uplink signal transmission period, the uplink signals ULS_rx2, ULS_rx4, ULS_rx6, and ULS_rx8 for the even numbered receiving electrodes may be supplied to the even numbered receiving electrodes 1212, 1214, 1216, and 1218.

Referring to FIG. 16, the uplink signal U may only be supplied to the receiving touch electrodes Rx_TE, and a signal other than uplink signal U may be supplied to the transmitting touch electrodes Tx_TE. A DC voltage or a ground voltage may be supplied to the transmitting touch electrodes Tx_TE, or the transmitting touch electrodes Tx_TE may be maintained in a floating state.

Referring to FIG. 16, as the display device 100 is driven by the local driving method, power consumption may be reduced.

Figure 17:
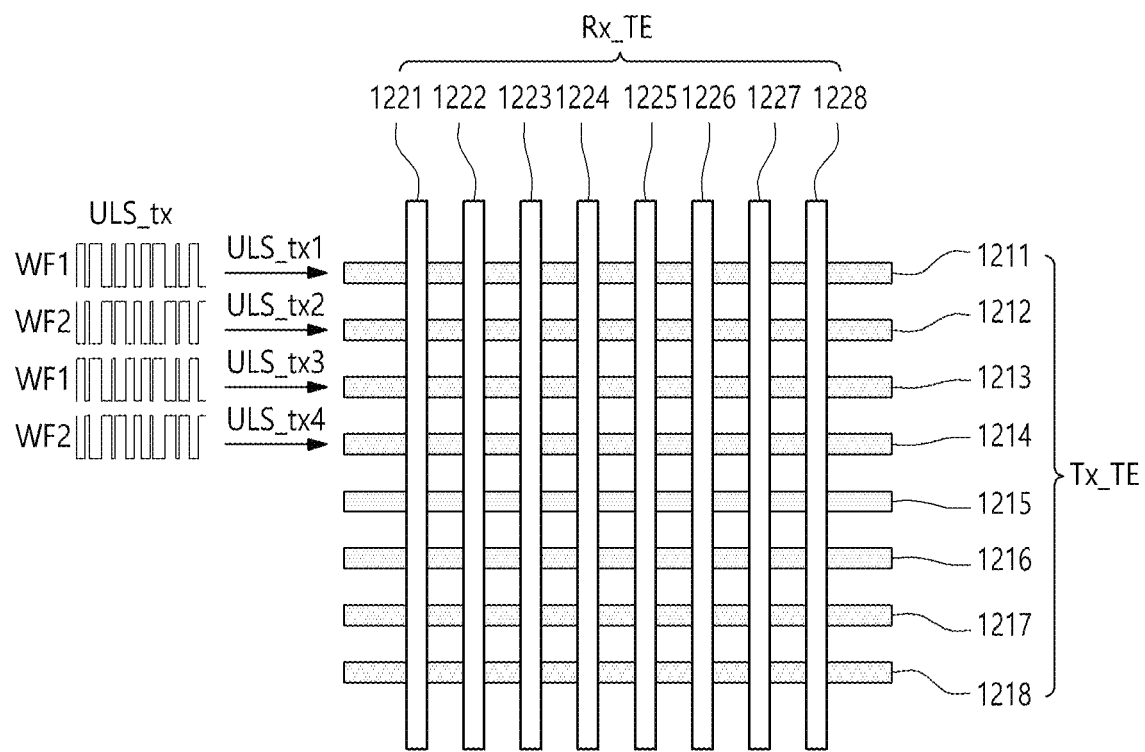

Referring to FIG. 17, the display device 100 may be driven by the local driving method.

Referring to FIG. 17, during the uplink signal transmission period, first waveform signals WF1 and second waveform signals WF2 may be alternately supplied to some of the transmitting touch electrodes Tx_TE. In contrast, during the uplink signal transmission period, a signal other than the uplink signal U may be supplied to the remaining transmitting touch electrodes Tx_TE and the receiving touch electrodes Rx_TE.

Referring to FIG. 17, the uplink signal ULS_rx for the first transmitting electrode and the uplink signal ULS_tx3 for the third transmitting electrode may be the first waveform signals WF1. During the uplink signal transmission period, the uplink signal ULS_rx for the first transmitting electrode may be supplied to the first transmitting electrode 1211, and the uplink signal ULS_tx3 for the third transmitting electrode may be supplied to the third transmitting electrode 1213.

Referring to FIG. 17, the uplink signal ULS_tx2 for the second transmitting electrode and the uplink signal ULS_tx4 for the fourth transmitting electrode may be the second waveform signals WF2. During the uplink signal transmission period, the uplink signal ULS_tx2 for the second transmitting electrode may be supplied to the second transmitting electrode 1212, and the uplink signal ULS_tx4 for the fourth transmitting electrode may be supplied to the fourth transmitting electrode 1214.

Referring to FIG. 17, the uplink signal U may only be supplied to some of the transmitting electrodes 1211, 1212, 1213, and 1214, and a signal other than the uplink signal U may be supplied to the remaining transmitting electrodes 1215, 1216, 1217, and 1218 and the receiving touch electrodes Rx_TE. A DC voltage or a ground voltage may be supplied to the remaining transmitting electrodes 1215, 1216, 1217, 1218 and the receiving touch electrodes Rx_TE. Alternatively, the remaining transmitting electrodes 1215, 1216, 1217, and 1218 and the receiving touch electrodes Rx_TE may be maintained in a floating state.

Referring to FIG. 17, as the display device 100 is driven by the local driving method, power consumption may be reduced.

Figure 18:
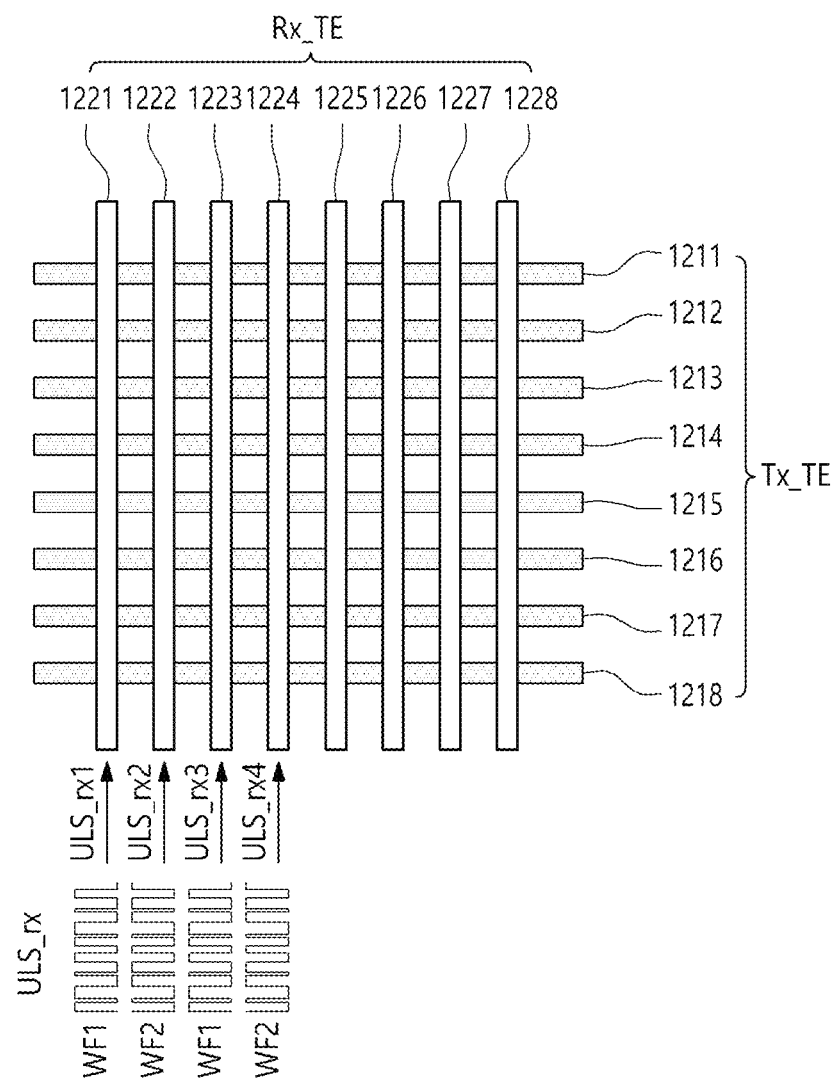

Referring to FIG. 18, the display device 100 may be driven by the local driving method.

Referring to FIG. 18, during the uplink signal transmission period, first waveform signals WF1 and second waveform signals WF2 may be alternately supplied to some of the receiving touch electrodes Rx_TE. In contrast, during the uplink signal transmission period, a signal other than the uplink signal U may be supplied to the remaining receiving touch electrodes Rx_TE and the transmitting touch electrodes Tx_TE.

Referring to FIG. 18, the uplink signal ULS_rx1 for the first receiving electrode and the uplink signal ULS_rx3 for the third receiving electrode may be the first waveform signals WF1. During the uplink signal transmission period, the uplink signal ULS_rx1 for the first receiving electrode may be supplied to the first receiving electrode 1221 and the uplink signal ULS_rx3 for the third receiving electrode may be supplied to the third receiving electrode 1223.

Referring to FIG. 18, the uplink signal ULS_rx2 for the second receiving electrode and the uplink signal ULS_rx4 for the fourth receiving electrode may be the second waveform signals WF2. During the uplink signal transmission period, the uplink signal ULS_rx2 for the second receiving electrode may be supplied to the second receiving electrode 1222, and the uplink signal ULS_rx4 for the fourth receiving electrode may be supplied to the fourth receiving electrode 1224.

Referring to FIG. 18, the uplink signal U may only be supplied to some of the receiving electrodes 1221, 1222, 1223, and 1224, and a signal other than the uplink signal U may be supplied to the remaining receiving electrodes 1225, 1226, 1227, and 1228 and the transmitting touch electrodes Tx_TE. A DC voltage or a ground voltage may be supplied to the remaining receiving electrodes 1225, 1226, 1228, and 1228 and the transmitting touch electrodes Tx_TE. Alternatively, the remaining receiving electrodes 1225, 1226, 1227, and 1228 and the transmitting touch electrodes Tx_TE may be maintained in a floating state.

Referring to FIG. 18, as the display device 100 is driven by the local driving method, power consumption may be reduced.

Figure 19:
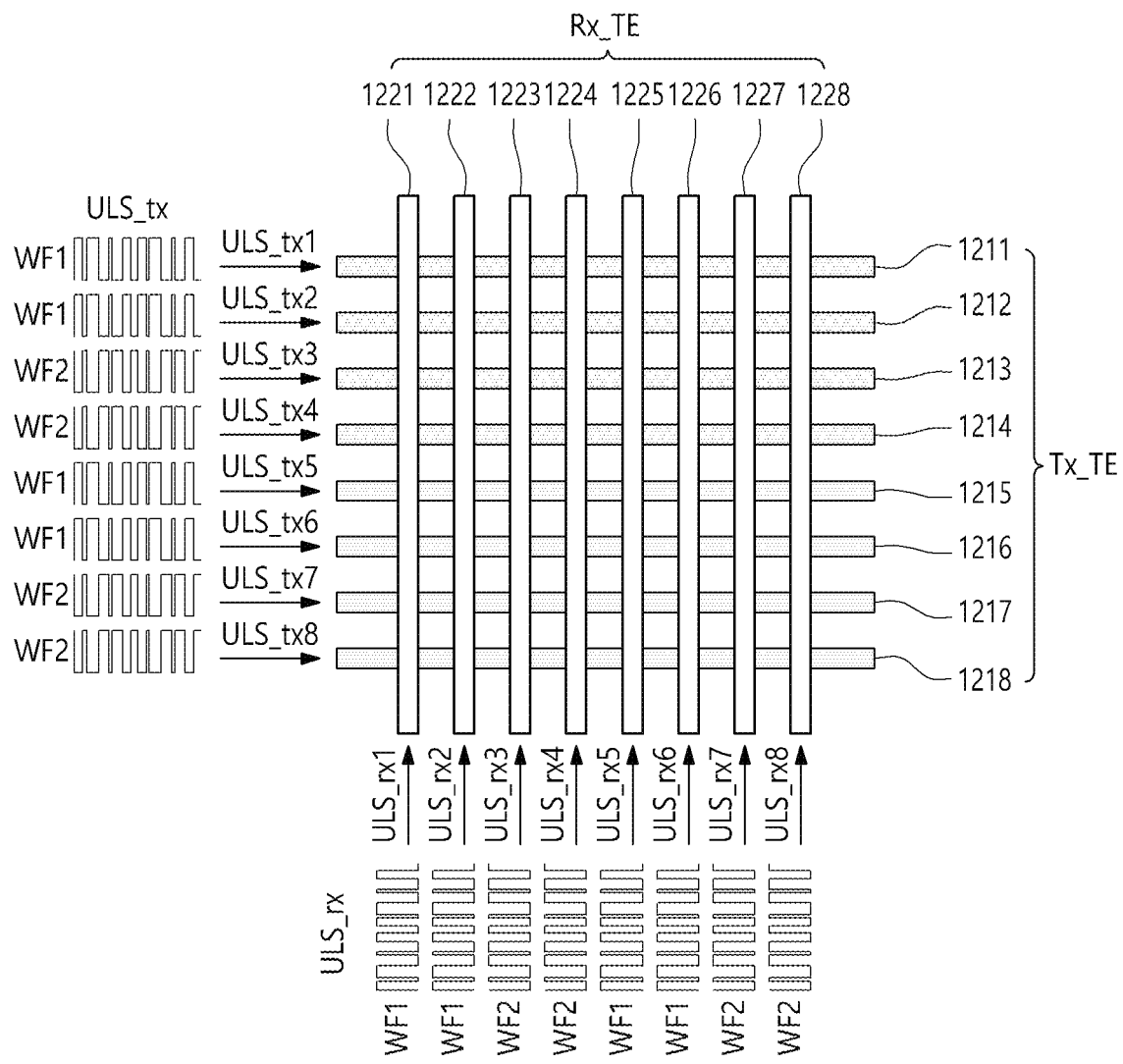

Referring to FIG. 19, during the uplink signal transmission period, two first waveform signals WF1 and two second waveform signals WF2 may be alternately supplied to the transmitting touch electrodes Tx_TE. Further, during the uplink signal transmission period, the two first waveform signals WF1 and the two second waveform signals WF2 may be alternately supplied to the receiving touch electrodes Rx_TE.

Referring to FIG. 19, the uplink signal ULS_rx for the first transmitting electrode and the uplink signal ULS_tx2 for the second transmitting electrode may be the first waveform signals WFL. During the uplink signal transmission period, the uplink signal ULS_rx for the first transmitting electrode may be supplied to the first transmitting electrode 1211, and the uplink signal ULS_tx2 for the second transmitting electrode may be supplied to the second transmitting electrode 1212.

Referring to FIG. 19, the uplink signal ULS_tx3 for the third transmitting electrode and the uplink signal ULS_tx4 for the fourth transmitting electrode may be second waveform signals WF2. During the uplink signal transmission period, the uplink signal ULS_tx3 for the third transmitting electrode may be supplied to the third transmitting electrode 1213, and the uplink signal ULS_tx4 for the fourth transmitting electrode may be supplied to the fourth transmitting electrode 1214.

Referring to FIG. 19, the uplink signal ULS_tx5 for the fifth transmitting electrode and the uplink signal ULS_tx6 for the sixth transmitting electrode may be the first waveform signals WF1. During the uplink signal transmission period, the uplink signal ULS_tx5 for the fifth transmitting electrode may be supplied to the fifth transmitting electrode 1215, and the uplink signal ULS_tx6 for the sixth transmitting electrode may be supplied to the sixth transmitting electrode 1216.

Referring to FIG. 19, the uplink signal ULS_tx7 for the seventh transmitting electrode and the uplink signal ULS_tx8 for the eighth transmitting electrode may be the second waveform signals WF2. During the uplink signal transmission period, the uplink signal ULS_tx7 for the seventh transmitting electrode may be supplied to the seventh transmitting electrode 1217, and the uplink signal ULS_tx8 for the eighth transmitting electrode may be supplied to the eighth transmitting electrode 1218.

Referring to FIG. 19, the uplink signal ULS_rx1 for the first receiving electrode and the uplink signal ULS_rx2 for the second receiving electrode may be the first waveform signals WF1. During the uplink signal transmission period, the uplink signal ULS_rx1 for the first receiving electrode may be supplied to the first receiving electrode 1221 and the uplink signal ULS_rx2 for the second receiving electrode may be supplied to the second receiving electrode 1222.

Referring to FIG. 19, the uplink signal ULS_rx3 for the third receiving electrode and the uplink signal ULS_rx4 for the fourth receiving electrode may be the second waveform signals WF2. During the uplink signal transmission period, the uplink signal ULS_rx3 for the third receiving electrode may be supplied to the third receiving electrode 1223, and the uplink signal ULS_rx4 for the fourth receiving electrode may be supplied to the fourth receiving electrode 1224.

Referring to FIG. 19, the uplink signal ULS_rx5 for the fifth receiving electrode and the uplink signal ULS_rx6 for the sixth receiving electrode may be the first waveform signals WF1. During the uplink signal transmission period, the uplink signal ULS_rx5 for the fifth receiving electrode may be supplied to the fifth receiving electrode 1225, and the uplink signal ULS_rx6 for the sixth receiving electrode may be supplied to the sixth receiving electrode 1226.

Referring to FIG. 19, the uplink signal ULS_rx7 for the seventh receiving electrode and the uplink signal ULS_rx8 for the eighth receiving electrode may be the second waveform signals WF2. During the uplink signal transmission period, the uplink signal ULS_rx7 for the seventh receiving electrode may be supplied to the seventh receiving electrode 1227, and the uplink signal ULS_rx8 for the eighth receiving electrode may be supplied to the eighth receiving electrode 1228.

Figure 20:
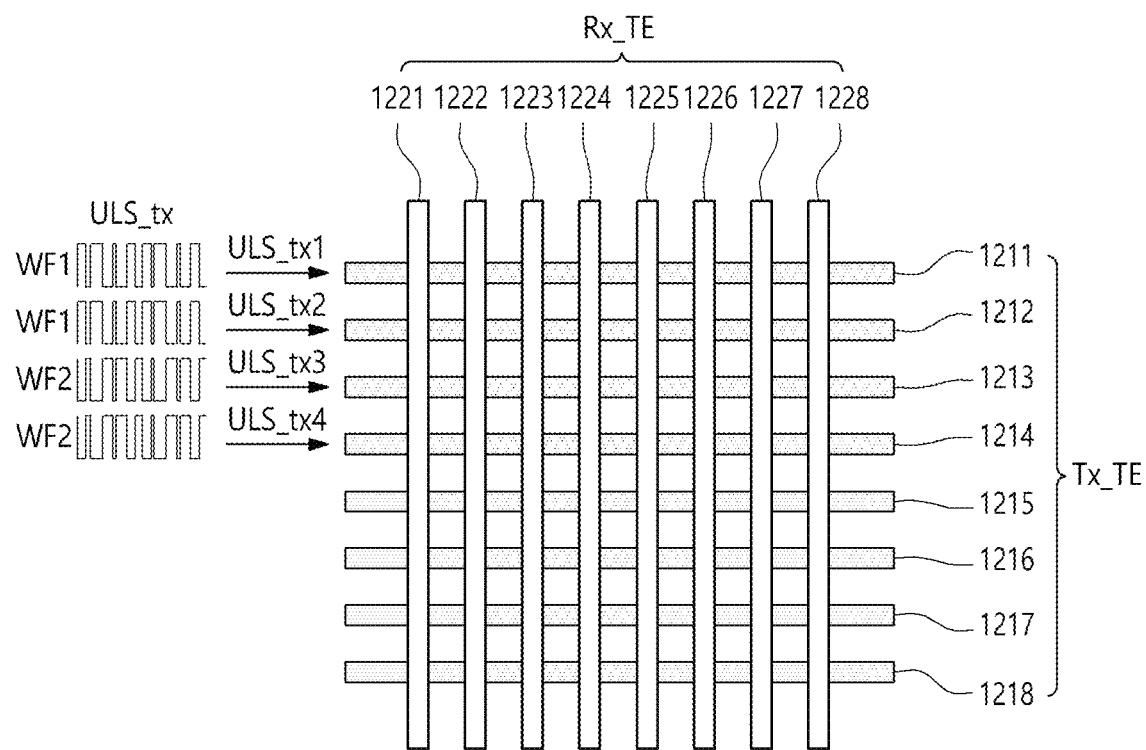

Referring to FIG. 20, the display device 100 may be driven by the local driving method.

Referring to FIG. 20, during the uplink signal transmission period, two first waveform signals WF1 and two second waveform signals WF2 may be alternately supplied to some of the transmitting touch electrodes Tx_TE. In contrast, during the uplink signal transmission period, a signal other than the uplink signal U may be supplied to the remaining transmitting touch electrodes Tx_TE and the receiving touch electrodes Rx_TE.

Referring to FIG. 20, the uplink signal ULS_rx for the first transmitting electrode and the uplink signal ULS_tx2 for the second transmitting electrode may be the first waveform signals WF1. During the uplink signal transmission period, the uplink signal ULS_rx for the first transmitting electrode may be supplied to the first transmitting electrode 1211, and the uplink signal ULS_tx2 for the second transmitting electrode may be supplied to the second transmitting electrode 1212.

Referring to FIG. 20, the uplink signal ULS_tx3 for the third transmitting electrode and the uplink signal ULS_tx4 for the fourth transmitting electrode may be the second waveform signals WF2. During the uplink signal transmission period, the uplink signal ULS_tx3 for the third transmitting electrode may be supplied to the third transmitting electrode 1213, and the uplink signal ULS_tx4 for the fourth transmitting electrode may be supplied to the fourth transmitting electrode 1214.

Referring to FIG. 20, as the display device 100 is driven by the local driving method, power consumption may be reduced.

Figure 21:
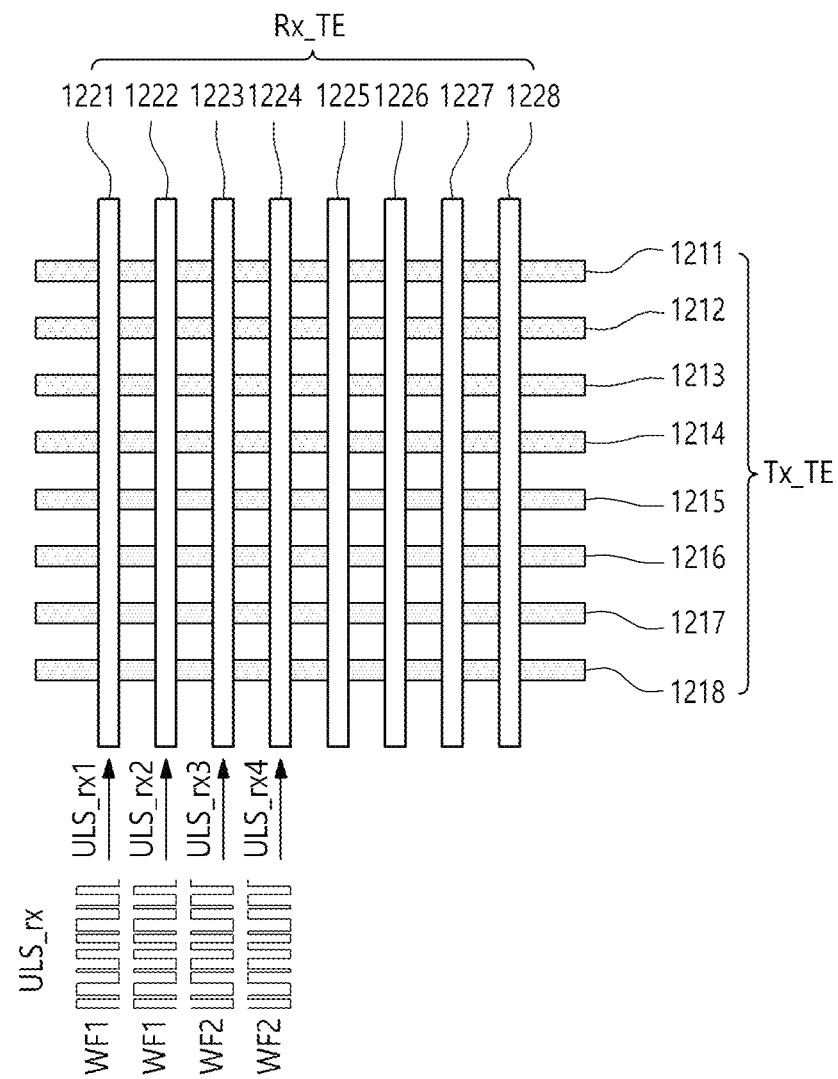

Referring to FIG. 21, the display device 100 may be driven by the local driving method.

Referring to FIG. 21, during the uplink signal transmission period, first waveform signals WF1 and second waveform signals WF2 may be alternately supplied to some of the receiving touch electrodes Rx_TE. In contrast, during the uplink signal transmission period, a signal other than the uplink signal U may be supplied to the remaining receiving touch electrodes Rx_TE and the transmitting touch electrodes Tx_TE.

Referring to FIG. 21, the uplink signal ULS_rx1 for the first receiving electrode and the uplink signal ULS_rx2 for the second receiving electrode may be the first waveform signals WF1. During the uplink signal transmission period, the uplink signal ULS_rx1 for the first receiving electrode may be supplied to the first receiving electrode 1221 and the uplink signal ULS_rx2 for the second receiving electrode may be supplied to the second receiving electrode 1222.

Referring to FIG. 21, the uplink signal ULS_rx3 for the third receiving electrode and the uplink signal ULS_rx4 for the fourth receiving electrode may be the second waveform signals WF2. During the uplink signal transmission period, the uplink signal ULS_rx3 for the third receiving electrode may be supplied to the third receiving electrode 1223, and the uplink signal ULS_rx4 for the fourth receiving electrode may be supplied to the fourth receiving electrode 1224.

Referring to FIG. 21, as the display device 100 is driven by the local driving method, power consumption may be reduced.

Figure 22:
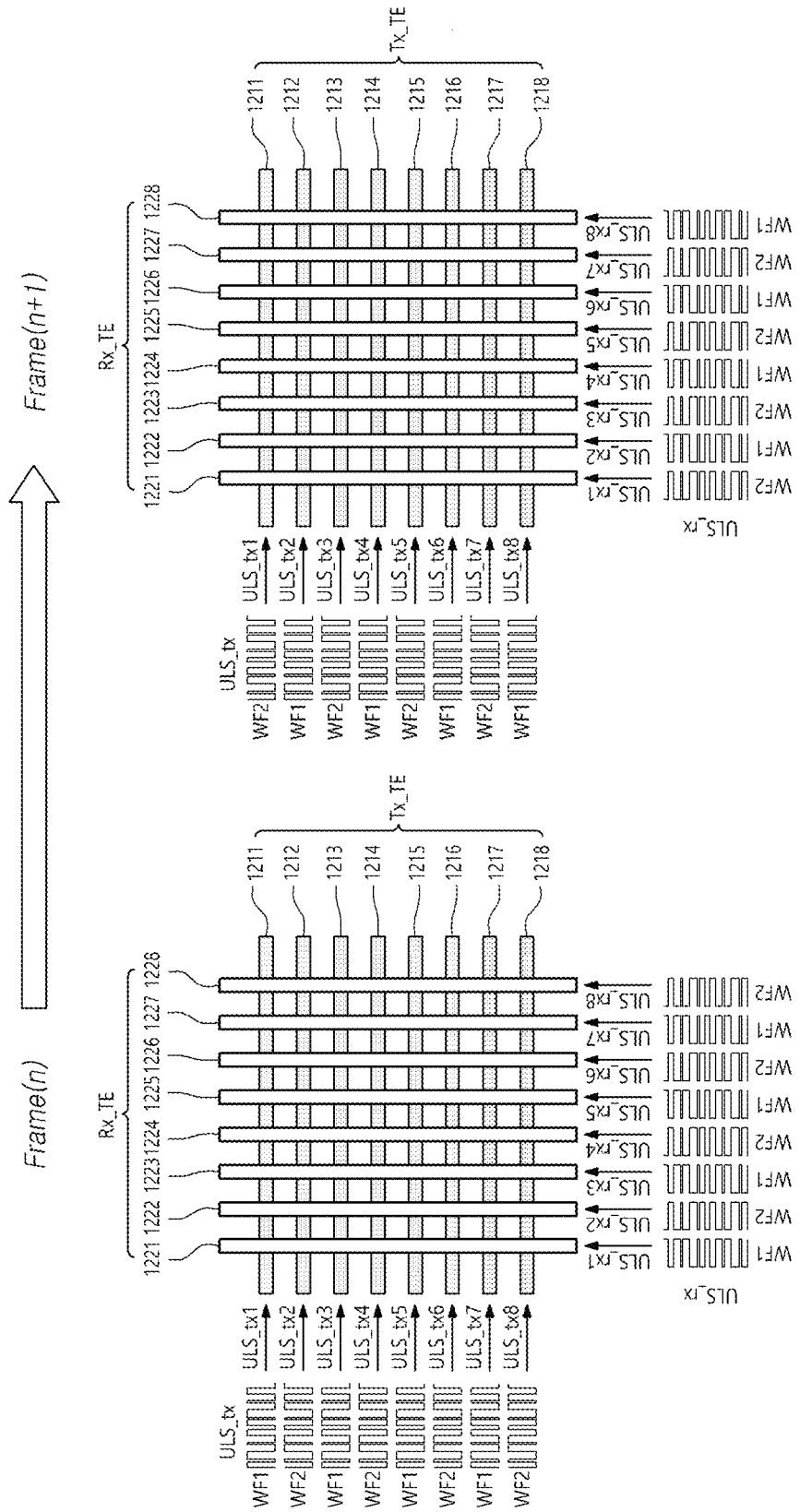

Referring to FIG. 22, when changing from the nth frame Frame(n) to the n+1st frame Frame(n+1), first waveform signals WF1 may be changed to second waveform signals WF2, and second waveform signals WF2 may be changed to first waveform signals WF1.

During the uplink signal transmission period of the ninth frame Frame(n), the uplink signal U supplied to the touchscreen panel TSP may be the same as the uplink signal U shown in FIG. 12.

The n+1st frame Frame(n+1) may be any frame appearing after the nth frame Frame(n).

During the uplink signal transmission period of the n+1st frame Frame(n+1), first waveform signals WF1 of the uplink signal U of the nth frame Frame(n) may be changed to second waveform signals WF2, and second waveform signals WF2 of the uplink signal U of the nth frame Frame(n) may be changed to first waveform signals WF1.

Referring to FIG. 22, the uplink signals ULS_tx1, ULS_tx3, ULS_tx5, and ULS_tx7 for the odd-numbered transmitting electrodes may be the second waveform signals WF2. During the uplink signal transmission period, the uplink signals ULS_tx1, ULS_tx3, ULS_tx5, and ULS_tx7 for the odd-numbered transmitting electrodes may be supplied to the odd-numbered transmitting electrodes 1211, 1213, 1215, and 1217.

Referring to FIG. 22, the uplink signals ULS_tx2, ULS_tx4, ULS_tx6, and ULS_tx8 for the even numbered transmitting electrodes may be the first waveform signals WF1. During the uplink signal transmission period, the uplink signals ULS_tx2, ULS_tx4, ULS_tx6, and ULS_tx8 for the even-numbered transmitting electrodes may be supplied to the even-numbered transmitting electrodes 1212, 1214, 1216, and 1218.

Referring to FIG. 22, the uplink signals ULS_rx1, ULS_rx3, ULS_rx5, and ULS_rx7 for the odd-numbered receiving electrodes may be the second waveform signals WF2. During the uplink signal transmission period, the uplink signals ULS_rx1, ULS_rx3, ULS_rx5, and ULS_rx7 for the odd-numbered receiving electrodes may be supplied to the odd-numbered receiving electrodes 1221, 1223, 1225, and 1227.

Referring to FIG. 22, the uplink signals ULS_rx2, ULS_rx4, ULS_rx6, and ULS_rx8 for the even-numbered receiving electrodes may be the first waveform signals WF1. During the uplink signal transmission period, the uplink signals ULS_rx2, ULS_rx4, ULS_rx6, and ULS_rx8 for the even-numbered receiving electrodes may be supplied to the even-numbered receiving electrodes 1212, 1214, 1216, and 1218.

In the uplink signal transmission period of the n+1st frame Frame(n+1), the local driving method illustrated in FIGS. 15 to 18, 20, and 21 may also be applied. Further, the method of alternately driving two first waveform signals WF1 and two second waveform signals WF2 shown in FIG. 19 may be applied.

Figure 23:
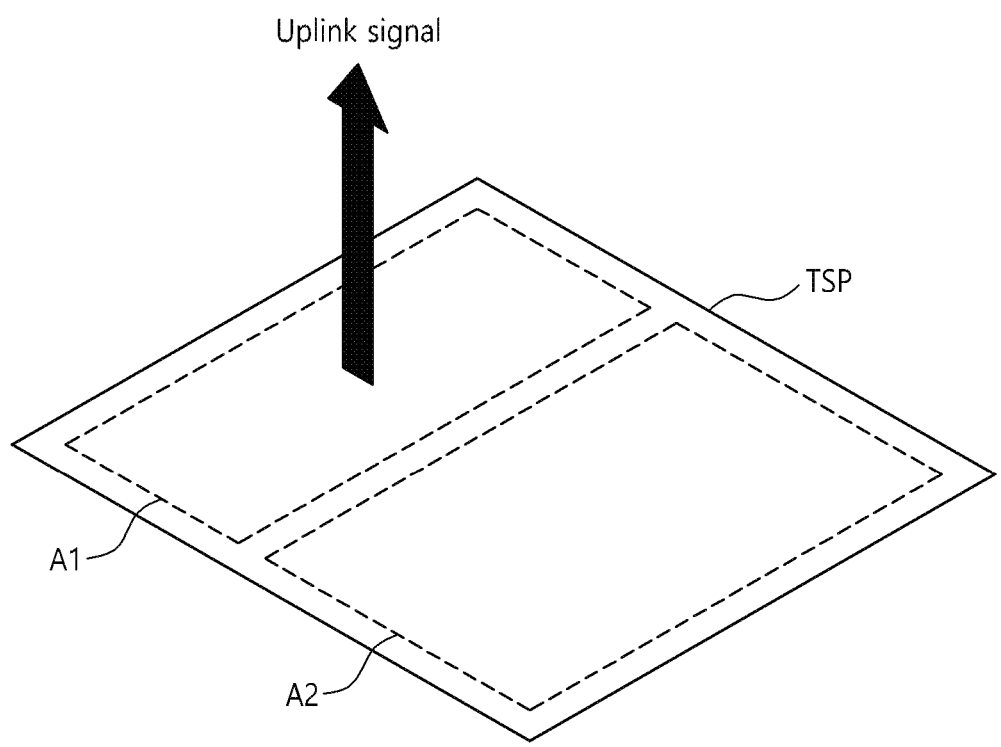
FIG. 23 illustrates local driving according to embodiments.

FIG. 23 illustrates local driving according to embodiments.

In a global driving method, an uplink signal may be supplied to the entirety of the area of the touchscreen panel TSP. In this case, communication with the pen 20 may be easily performed. In contrast, when the local driving method is used, the uplink signal may be supplied to a portion of the area of the touchscreen panel TSP. In this case, the power consumption may be further reduced relatively.

Referring to FIG. 23, the area of the touchscreen panel TSP may be divided into a first area A1 and a second area A2. When the touchscreen panel TSP is driven by the local driving method, the uplink signal may only be supplied to the first area A1.

Referring to FIG. 23, the second area A2 may be an area to which no uplink signal is supplied. That is, because it is undesirable to supply an uplink signal to the second area A2, no voltage control is performed, and the touch electrodes in the second area A2 may be in a floating state. However, for the stability of the voltage control, a ground voltage or a constant DC voltage may be supplied to the touch electrodes. In addition, in some cases, an AC signal different from the uplink signal may be supplied.

Referring to FIG. 23, the area of the touchscreen panel TSP is illustrated as being divided into the first area A1 and the second area A2, but there is no limit to how the area of the touchscreen panel TSP is divided. For example, the touchscreen panel TSP may include a plurality of areas to which an uplink signal is supplied and a plurality of areas to which no uplink signal is supplied. Referring to FIG. 16, the first area A1 and the second area A2 are illustrated as rectangles, but there is no limit to how the area is divided.

Figure 24:
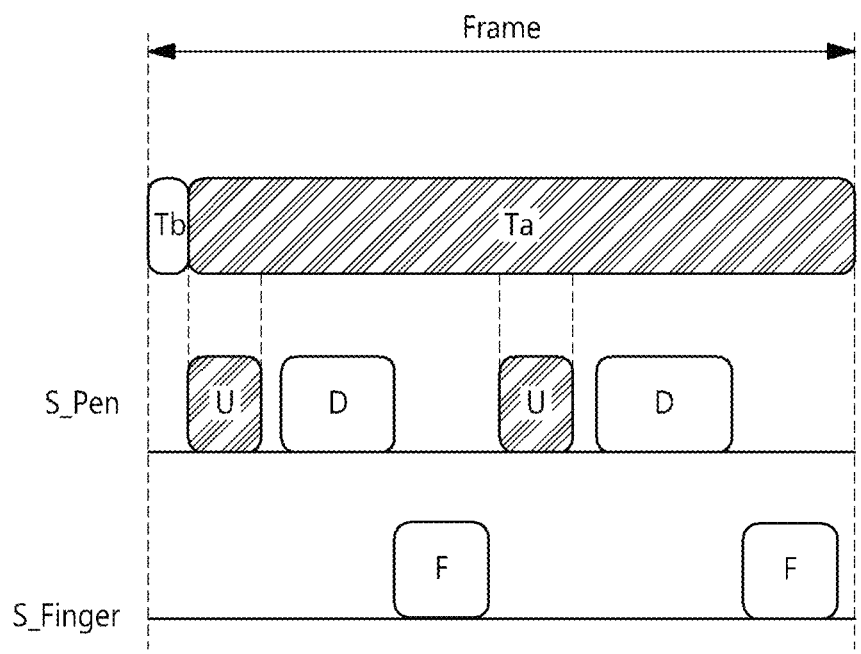
FIGS. 24 and 25 illustrate the pen touch driving and finger touch driving performed during a single frame period according to embodiments.
Figure 25:
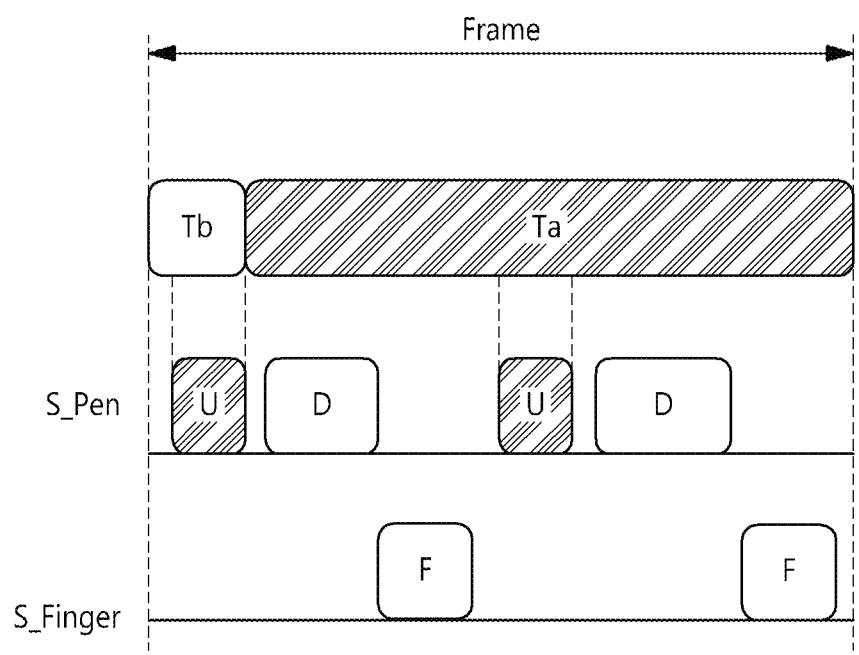

FIGS. 24 and 25 illustrate the pen touch driving and finger touch driving performed during a single frame period Frame according to embodiments.

Referring to FIG. 24, because the alternating uplink signal U shown in FIGS. 12 to 22 is supplied to the touch electrodes TE, the issue of the display driving being affected by the uplink signal U may be prevented. Therefore, the display driving period and the uplink signal transmission period may be operated concurrently (or in some embodiments, simultaneously). Even in a case in which the display driving period and the uplink signal transmission period are operated concurrently (or in some embodiments, simultaneously), the issue of the display driving being affected by the uplink signal U may be prevented.

Referring to FIG. 24, when the display driving period and the uplink signal transmission period are driven concurrently (or in some embodiments, simultaneously), it is not necessary to match the period during which the uplink signal U is supplied with a blank period Tb. Accordingly, the period during which the uplink signal U is supplied and the blank period Tb may be independent of each other.

To illustrate a particular time period, assume that the touch display device 10 is driven at 120 Hz. In this case, the duration of a single frame period Frame may be 8.3 ms.

In the case of time-sharing driving, when the period during which the uplink signal U is supplied is about 0.34 ms, the blank period Tb should be at least greater than 0.34 ms. Because embodiments enable simultaneous driving, the period during which the uplink signal U is supplied and the blank period Tb are independent of each other. Therefore, the blank period Tb may be relatively reduced. For example, when the period during which the uplink signal U is supplied is about 0.34 ms, the blank period Tb may be reduced to 0.08 ms. In this case, the active period Ta may be increased to 8.2 ms.

As described above, even in a case in which embodiments are operated by the simultaneous driving, the issue of the display driving being affected by the uplink signal U may be avoided. However, the display driving period and the uplink signal transmission period are applicable to the time-sharing driving in addition to the simultaneous driving.

Referring to FIG. 25, the period during which the uplink signal U is supplied may be during the blank period Tb. In this case, the blank period Tb may be adjusted to match the period during which the uplink signal U is supplied. When the blank period Tb in FIG. 24 is 0.08 ms, the blank period Tb in FIG. 25 may be 0.34 ms. When the period during which the uplink signal U is supplied coincides with the blank period Tb, the effect on the cathode CE by the time-sharing driving may be reliably prevented.

Figure 26:
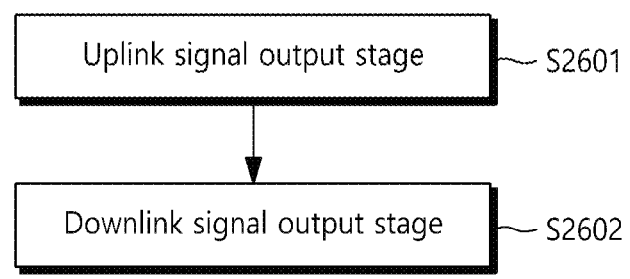
FIG. 26 is a flowchart illustrating a driving method for a touch display device according to embodiments.

FIG. 26 is a flowchart illustrating a driving method for a touch display device according to embodiments.

The driving method for the touch display device may include an uplink signal output stage S2601 and a downlink signal output stage S2602.

The uplink signal output stage S2601 may be an operation of supplying an uplink signal to a touchscreen panel on which a plurality of touch electrodes are disposed. The uplink signal may include a first uplink signal and a second uplink signal. The first uplink signal may be supplied to the first touch electrode, and the second uplink signal may be supplied to the second touch electrode. The first uplink signal may have a positive signal value, and the second uplink signal may have a negative signal value.

The downlink signal output stage S2602 may be an operation in which the pen supplied with the uplink signal outputs a downlink signal corresponding to the uplink signal.

The embodiments described above will be briefly described as follows.

Embodiments may provide a touch display device including: a display panel on which a plurality of subpixels are disposed; a touchscreen panel on which a plurality of touch electrodes are disposed; and a touch circuit supplying an uplink signal and a touch driving signal to the touchscreen panel, wherein the uplink signal includes a first uplink signal and a second uplink signal, the first uplink signal that is a first wavelength signal is supplied to a first touch electrode among the touch electrodes, and the second uplink signal that is a second wavelength signal having a different waveform from the first wavelength signal is supplied to a second touch electrode among the touch electrodes.

The second wavelength signal may be a signal inverted with respect to the first wavelength signal.

The second wavelength signal may be a signal out-of-phase with respect to the first waveform signal.

The touch electrodes may include a plurality of transmitting electrodes and a plurality of receiving electrodes alternating with the transmitting electrodes.

The first touch electrode may be a first transmitting electrode, and the second touch electrode may be a second transmitting electrode. When a third uplink signal that is the first wavelength signal is supplied to a first receiving electrode among the receiving electrodes, a fourth uplink signal that is the second wavelength signal may be supplied to a second receiving electrode among the receiving electrodes.

The first touch electrode may be a first transmitting electrode, and the second touch electrode may be a second transmitting electrode. The receiving electrodes may be in a floating state or be supplied with a direct-current voltage.

A third transmitting electrode and a fourth transmitting electrode among the transmitting electrodes may be in a floating state or be supplied with a direct-current voltage.

the first touch electrode may be a first receiving electrode, and the second touch electrode may be a second receiving electrode. The transmitting electrodes may be in a floating state, or a direct-current voltage may be supplied to the receiving electrodes.

A third receiving electrode and a fourth receiving electrode among the receiving electrodes may be in a floating state or be supplied with a direct-current voltage.

The second touch electrode may be disposed adjacent to the first touch electrode.

A third touch electrode and a fourth touch electrode among the touch electrodes may be disposed between the first touch electrode and the second touch electrode. The third touch electrode disposed adjacent to the first touch electrode may be supplied with a third uplink signal that is the first wavelength signal. The fourth touch electrode disposed adjacent to the second touch electrode may be supplied with a fourth uplink signal that is the second wavelength signal.

The first touch electrode, the second touch electrode, the third touch electrode, and the fourth touch electrode may be transmitting electrodes. A plurality of receiving electrodes may be disposed to alternate with the transmitting electrodes, the receiving electrodes being in a floating state or being supplied with a direct-current voltage.

The first touch electrode, the second touch electrode, the third touch electrode, and the fourth touch electrode may be receiving electrodes. A plurality of transmitting electrodes may be disposed to alternate with the receiving electrodes, the transmitting electrodes being in a floating state or being supplied with a direct-current voltage.

A period in which the touch circuit is driven may include a first period and a second period. During the first period, the first touch electrode may be supplied with the first uplink signal that is the first wavelength signal, and the second touch electrode may be supplied with the second uplink signal that is the second wavelength signal. During the second period after the first period, the first touch electrode may be supplied with the first uplink signal that is the second wavelength signal, and the second touch electrode may be supplied with the second uplink signal that is the first wavelength signal.

the touchscreen panel may include a first area and a second area, the touch circuit may supply the uplink signal to the first area, and a touch electrode in the second area among the touch electrodes may be in a floating state or is supplied with a direct-current voltage.

The uplink signal may include a beacon signal.

In a single frame display active period, the touch circuit may supply the uplink signal to the touchscreen panel.

A period in which the display panel is driven may include an active period in which the subpixels emit light and a blank period in which the subpixels are in a non-emitting state. The uplink signal may be supplied to the touchscreen panel during the blank period.

Embodiments may provide a driving method for a touch display device, the driving method including: an uplink signal output operation of supplying an uplink signal to a touchscreen panel on which plurality of touch electrodes are disposed; and a downlink signal output operation in which a pen that has received the uplink signal outputs a downlink signal corresponding to the uplink signal, wherein the first uplink signal is supplied to a first touch electrode among the touch electrodes, and the second uplink signal is supplied to a second touch electrode among the touch electrodes.

The first touch electrode and the second touch electrode may extend in a single direction and be adjacent to each other.

The above description provides examples of the present disclosure for illustrative purposes only. A person having ordinary knowledge in the technical field of the art, to which the present disclosure pertains, will appreciate that various modifications are possible without departing from the essential features of the present disclosure. Therefore, the examples disclosed in the present disclosure are intended to illustrate the technical idea of the present disclosure, and the scope of the present disclosure is not limited thereby.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
a display panel on which a plurality of subpixels is disposed;
a touchscreen panel on which a plurality of touch electrodes is disposed; and
a touch circuit configured to supply an uplink signal and a touch driving signal to the touchscreen panel,
wherein the uplink signal comprises a first uplink signal and a second uplink signal,
wherein the first uplink signal that is a first wavelength signal is supplied to a first touch electrode among the plurality of touch electrodes in a first period,
wherein the second uplink signal that is a second wavelength signal having a different waveform from the first wavelength signal is supplied to a second touch electrode among the plurality of touch electrodes in the first period,
wherein a period in which the display panel is driven comprises an active period in which the subpixels emit light and a blank period in which the subpixels are in a non-emitting state, and
wherein the uplink signal is supplied to the touchscreen panel during the blank period.

2. The touch display device of claim 1, wherein the second wavelength signal is a signal inverted with respect to the first wavelength signal.

3. The touch display device of claim 1, wherein the second wavelength signal is a signal out-of-phase with respect to the first waveform signal.

4. The touch display device of claim 1, wherein the touch electrodes comprise a plurality of transmitting electrodes and a plurality of receiving electrodes crossing the plurality of transmitting electrodes.

5. The touch display device of claim 4, wherein the first touch electrode is a first transmitting electrode, and the second touch electrode is a second transmitting electrode, and
wherein when a third uplink signal that is the first wavelength signal is supplied to a first receiving electrode among the plurality of receiving electrodes, a fourth uplink signal that is the second wavelength signal is supplied to a second receiving electrode among the plurality of receiving electrodes in the first period.

6. The touch display device of claim 4, wherein the first touch electrode is a first transmitting electrode, and the second touch electrode is a second transmitting electrode, and
wherein the plurality of receiving electrodes is in a floating state or are supplied with a direct-current voltage.

7. The touch display device of claim 4, wherein the first touch electrode is a first transmitting electrode, and the second touch electrode is a second transmitting electrode, and
wherein a third transmitting electrode and a fourth transmitting electrode among the plurality of transmitting electrodes are in a floating state or are supplied with a direct-current voltage.

8. The touch display device of claim 4, wherein the first touch electrode is a first receiving electrode, and the second touch electrode is a second receiving electrode, and
wherein the plurality of receiving electrodes is in a floating state, or a direct-current voltage is supplied to the plurality of receiving electrodes in the first period.

9. The touch display device of claim 8, wherein a third receiving electrode and a fourth receiving electrode among the plurality of receiving electrodes are in a floating state or are supplied with a direct-current voltage in the first period.

10. The touch display device of claim 1, wherein the second touch electrode is disposed adjacent to the first touch electrode.

11. The touch display device of claim 1, wherein a third touch electrode and a fourth touch electrode among the plurality of touch electrodes are disposed between the first touch electrode and the second touch electrode, wherein the third touch electrode disposed adjacent to the first touch electrode is supplied with a third uplink signal that is the first wavelength signal in the first period, and wherein the fourth touch electrode disposed adjacent to the second touch electrode is supplied with a fourth uplink signal that is the second wavelength signal in the first period.

12. The touch display device of claim 11, wherein the first touch electrode, the second touch electrode, the third touch electrode, and the fourth touch electrode are transmitting electrodes, and wherein a plurality of receiving electrodes is disposed to cross the transmitting electrodes, the plurality of receiving electrodes being in a floating state or being supplied with a direct-current voltage in the first period.

13. The touch display device of claim 11, wherein the first touch electrode, the second touch electrode, the third touch electrode, and the fourth touch electrode are receiving electrodes, and wherein a plurality of transmitting electrodes is disposed to cross the receiving electrodes, the plurality of transmitting electrodes being in a floating state or being supplied with a direct-current voltage in the first period.

14. The touch display device of claim 1, wherein a period in which the touch circuit is driven further comprises a first period and a second period, during the first period, the first touch electrode is supplied with the first uplink signal that is the first wavelength signal, and the second touch electrode is supplied with the second uplink signal that is the second wavelength signal, and during the second period after the first period, the first touch electrode is supplied with the first uplink signal that is the second wavelength signal, and the second touch electrode is supplied with the second uplink signal that is the first wavelength signal.

15. The touch display device of claim 1, wherein the touchscreen panel comprises a first area and a second area, wherein the touch circuit is configured to supply the uplink signal to the first area, and wherein a touch electrode in the second area among the plurality of touch electrodes is in a floating state or is supplied with a direct-current voltage.

16. The touch display device of claim 1, wherein the uplink signal comprises a beacon signal.

17. The touch display device of claim 1, wherein in a display active period of a single frame, the touch circuit supplies the uplink signal to the touchscreen panel.

18. A driving method comprising:

an uplink signal output operation of supplying an uplink signal to a touchscreen panel on which plurality of touch electrodes are disposed; and a downlink signal output operation in which a pen that has received the uplink signal outputs a downlink signal corresponding to the uplink signal, wherein a first uplink signal that is a first wavelength signal is supplied to a first touch electrode among the plurality of touch electrodes in a first period, wherein a second uplink signal that is a second wavelength signal having a different waveform from the first wavelength signal is supplied to a second touch electrode among the plurality of touch electrodes in the first period, wherein a period in which a display panel is driven comprises an active period in which subpixels emit light and a blank period in which the subpixels are in a non-emitting state, and wherein the uplink signal is supplied to the touchscreen panel during the blank period.

19. The driving method of claim 18, wherein the first touch electrode and the second touch electrode extend in a single direction and are adjacent to each other.

* * * * *